US012574207B2

(12) United States Patent　　　(10) Patent No.: US 12,574,207 B2
Galvin　　　　　　　　　　　　　(45) **Date of Patent: *Mar. 10, 2026**

(54) CODEBOOK-BASED HOMOMORPHIC ENCRYPTION FOR EFFICIENT AND PRIVACY-PRESERVING DATA PROCESSING

(71) Applicant: AtomBeam Technologies Inc., Moraga, CA (US)

(72) Inventor: Brian Galvin, Silverdale, WA (US)

(73) Assignee: ATOM BEAM TECHNOLOGIES INC., Moraga, CA (US)

( * ) Notice: Subject to any disclaimer, the term of this patent is extended or adjusted under 35 U.S.C. 154(b) by 83 days.

This patent is subject to a terminal disclaimer.

(21) Appl. No.: 18/888,656

(22) Filed: Sep. 18, 2024

(65) Prior Publication Data

US 2026/0005831 A1　　Jan. 1, 2026

Related U.S. Application Data

(63) Continuation of application No. 18/755,627, filed on Jun. 26, 2024, now Pat. No. 12,200,102.

(51) Int. Cl.
H04L 9/00　　　(2022.01)
(52) U.S. Cl.
CPC .................................... H04L 9/008 (2013.01)
(58) Field of Classification Search
CPC ....................................................... H04L 9/008
See application file for complete search history.

(56) References Cited

U.S. PATENT DOCUMENTS

| 10,192,258 | B2 | 1/2019 | Devries |
| 10,606,931 | B2 | 3/2020 | Wick et al. |
| 10,789,374 | B2 | 9/2020 | Fujiwara et al. |
| 10,880,275 | B2 * | 12/2020 | Williams .......... G06F 16/90335 |
| 11,343,069 | B2 * | 5/2022 | Vald ......................... H04L 9/008 |
| 11,632,358 | B2 | 4/2023 | Soon-Shiong et al. |
| 11,777,729 | B2 | 10/2023 | Williams et al. |
| 11,836,466 | B2 * | 12/2023 | Hein .................... G06N 3/0675 |

(Continued)

*Primary Examiner* — Viral S Lakhia
(74) *Attorney, Agent, or Firm* — GALVIN PATENT LAW LLC; Brian R. Galvin

(57)　　　　　ABSTRACT

The codebook-based homomorphic compression system is a novel approach that combines data compression and homomorphic encryption to enable efficient and secure computation on compressed data. It involves quantizing the input data, generating an optimized codebook using techniques like Huffman coding or deep learning, and compressing the data by replacing each value with its corresponding codeword. The compressed data is then encrypted using a homomorphic encryption scheme, such as the Paillier cryptosystem, allowing computations to be performed directly on the encrypted compressed data without decryption. Homomorphic properties of the encryption scheme enable operations like addition and multiplication on the ciphertexts, while preserving the confidentiality of the underlying data. The system also incorporates error correction techniques to mitigate the impact of quantization and encryption on the accuracy of the computations. This approach combines the benefits of data compression and homomorphic encryption, enabling efficient storage, transmission, and secure computation on compressed data.

16 Claims, 12 Drawing Sheets

(56) References Cited

U.S. PATENT DOCUMENTS

| | | | | |
|---|---|---|---|---|
| 11,914,862 | B2 * | 2/2024 | Zamir | H03M 7/6094 |
| 11,949,770 | B2 | 4/2024 | Sirdey et al. | |
| 11,975,218 | B2 | 5/2024 | Fay et al. | |
| 12,040,820 | B2 * | 7/2024 | Cooper | H03M 7/6005 |
| 12,149,263 | B2 * | 11/2024 | Isik | H03M 7/3082 |
| 12,273,436 | B2 * | 4/2025 | Gouget | G06F 21/602 |
| 2019/0236283 | A1 | 8/2019 | Koster et al. | |
| 2022/0376888 | A1 * | 11/2022 | Sarpatwar | H04L 9/0894 |
| 2024/0137205 | A1 | 4/2024 | Adir et al. | |
| 2024/0178989 | A1 * | 5/2024 | Dolev | G06N 3/082 |
| 2024/0211132 | A1 * | 6/2024 | Cooper | G06F 3/067 |

* cited by examiner

Determine the range of the data by finding the minimum and maximum
values in the input data
601

Calculate the interval size by dividing the range of the data by the number of
intervals
602

Create quantization intervals
603

Assign codewords to each interval
604

Quantize the data
605

600

Count the frequency of each unique value in the data
701

Create a priority queue to store the nodes of the Huffman tree
702

Build the Huffman tree
703

Extract the codebook from the Huffman tree
704

700

Count the frequency of each unique value in the data
801

Calculate the probability of each symbol by dividing its frequency by the total count of symbols
802

Sort the symbols based on their probabilities
803

Generate the cumulative probability ranges of each symbol
804

Create the codebook by assigning the cumulative probability range to each symbol
805

800

Convert the input data to a suitable format
901

Create an autoencoder
902

Define the loss function and optimizer
903

Train the autoencoder for the specified epochs
904

Generate the codebook by passing the input data through the trained autoencoder
905

900

Iterate over each symbol in the input data
1001

For each symbol, retrieve the corresponding code from a codebook suing the symbol as the key
1002

Append the code to the compressed data list
1003

Return the compressed data
1004

1000

Select two large prime numbers
1101

Receive plaintext input and covert it to a ciphertext
1102

Perform homomorphic operations on the ciphertexts
1003

1100

CODEBOOK-BASED HOMOMORPHIC ENCRYPTION FOR EFFICIENT AND PRIVACY-PRESERVING DATA PROCESSING

CROSS-REFERENCE TO RELATED APPLICATIONS

Priority is claimed in the application data sheet to the following patents or patent applications, each of which is expressly incorporated herein by reference in its entirety:
  Ser. No. 18/755,627

BACKGROUND OF THE INVENTION

Field of the Art

The present invention relates to the field of data compression and privacy-preserving computation, particularly in the context of efficient and secure processing of large-scale data.

Discussion of the State of the Art

Data compression plays an important role in reducing storage and transmission costs in various domains, such as IoT, cloud computing, and big data analytics. Existing compression techniques, such as entropy coding (e.g., Huffman coding, arithmetic coding) and dictionary-based methods (e.g., LZ77, LZ78), have been widely used to compress data efficiently. However, these traditional compression methods do not inherently support computations on the compressed data, limiting their applicability in scenarios that require privacy-preserving processing or direct operations on compressed representations.

Homomorphic encryption has emerged as a promising solution for enabling computations on encrypted data without requiring decryption. Fully homomorphic encryption (FHE) schemes, such as the Brakerski-Gentry-Vaikuntanathan (BGV) scheme and the Cheon-Kim-Kim-Song (CKKS) scheme, allow arbitrary computations on encrypted data. However, FHE schemes often result in significant ciphertext expansion and computational overhead, making them impractical for many real-world applications.

Attempts have been made to combine data compression with homomorphic encryption to reduce the ciphertext size and improve computational efficiency. For example, the work by Liu et al. (2019) proposed a compression scheme for homomorphic encrypted data using a combination of quantization and encoding techniques. Another approach by Chen et al. (2020) utilized a deep learning-based compression framework to compress homomorphic encrypted data. While these methods achieve some level of compression, they rely on specific encryption schemes and do not provide a general framework for enabling computations on compressed data.

The current state of the art lacks a comprehensive solution that seamlessly integrates data compression with homomorphic properties, allowing for efficient storage, transmission, and processing of compressed data while preserving privacy. Existing methods either focus on traditional compression techniques without considering homomorphic operations or rely on specific encryption schemes that introduce significant overhead.

Therefore, there is a need for a novel approach that combines the benefits of data compression and homomorphic computation, enabling efficient and privacy-preserving processing of compressed data. The proposed codebook-based homomorphic compression technique addresses this need by providing a general framework that allows for direct computations on compressed data without relying on specific encryption schemes. By quantizing the data, generating an optimized codebook, and performing homomorphic operations on the compressed representations, the technique achieves significant compression ratios while enabling essential computations, such as addition, subtraction, and averaging, directly on the compressed data.

The proposed invention advances the state of the art by providing a practical and efficient solution for homomorphic compression, opening up new possibilities for privacy-preserving data processing and analysis in various domains, such as IoT, cloud computing, and secure data analytics.

SUMMARY OF THE INVENTION

Accordingly, the inventor has conceived and reduced to practice, a system and method for codebook-based homomorphic encryption that combines data compression and homomorphic encryption to enable efficient and secure computation on compressed data. It involves quantizing the input data, generating an optimized codebook using techniques like Huffman coding or deep learning, and compressing the data by replacing each value with its corresponding codeword. The compressed data is then encrypted using a homomorphic encryption scheme, such as the Paillier cryptosystem, allowing computations to be performed directly on the encrypted compressed data without decryption. Homomorphic properties of the encryption scheme enable operations like addition and multiplication on the ciphertexts, while preserving the confidentiality of the underlying data. The system also incorporates error correction techniques to mitigate the impact of quantization and encryption on the accuracy of the computations. This approach combines the benefits of data compression and homomorphic encryption, enabling efficient storage, transmission, and secure computation on compressed data.

According to a preferred embodiment, a method for homomorphic data compression is disclosed, comprising the steps of: quantizing input data into a finite set of intervals, each interval represented by a unique codeword; generating a codebook by assigning codewords to intervals based on a selected codebook generation technique; compressing the quantized data by replacing each interval with its corresponding codeword from the codebook; and performing homomorphic operations directly on the compressed codewords.

According to another preferred embodiment, a system for homomorphic data compression is disclosed, comprising: a computing device comprising at least a memory and a processor; a codebook-based homomorphic encryption platform comprising a first plurality of programming instructions stored in the memory and operable on the processor, wherein the first plurality of programming instructions, when operating on the processor, cause the computing device to: quantize input data into a finite set of intervals, each interval represented by a unique codeword; generate a codebook by assigning codewords to intervals based on a selected codebook generation technique; compress the quantized data by replacing each interval with its corresponding codeword from the codebook; and perform homomorphic operations directly on the compressed codewords.

According to an aspect of an embodiment, the selected codebook generation technique is chosen from the group consisting of Huffman coding, arithmetic coding, and entropy-based coding.

According to an aspect of an embodiment, the homomorphic operations include at least one of addition, subtraction, and multiplication.

According to an aspect of an embodiment, further comprising the step of applying at least one error correction technique to improve the accuracy of the homomorphic operations.

According to an aspect of an embodiment, the at least one error correction technique includes Residue Number System (RNS) encoding.

According to an aspect of an embodiment, wherein the RNS encoding comprises: representing each codeword as a set of residues modulo a selected set of pairwise coprime moduli; performing homomorphic operations independently on each residue; and combining the results using the Chinese Remainder Theorem to obtain the final result.

According to an aspect of an embodiment, the at least one error correction technique includes the application of error correction codes.

According to an aspect of an embodiment, the error correction codes are selected from the group consisting of Reed-Solomon codes, Bose-Chaudhuri-Hocquenghem codes, and Golay codes.

According to an aspect of an embodiment, wherein the at least one error correction technique includes bootstrapping, comprising: homomorphically decrypting the compressed codewords to obtain intermediate plaintext results; applying error correction techniques to the intermediate plaintext results; and homomorphically re-encrypting the corrected plaintext results to obtain updated compressed codewords.

According to an aspect of an embodiment, wherein the at least one error correction technique includes iterative refinement, comprising: performing the homomorphic operations on the compressed codewords to obtain initial results; and iteratively applying error correction techniques to the initial results and using the corrected results as input for subsequent iterations until a desired level of accuracy is achieved.

According to an aspect of an embodiment, wherein the at least one error correction technique includes codebook optimization, comprising: constructing the codebook using a learning-based approach to minimize approximation errors when performing homomorphic operations on the codewords; and training a machine learning model to generate codewords that minimize the difference between the homomorphic operation results and the expected results.

According to an aspect of an embodiment, wherein generating the codebook comprises: constructing the codebook using a learning-based approach to minimize approximation errors when performing homomorphic operations on the codewords; and training a machine learning model to generate codewords that minimize the difference between the homomorphic operation results and the expected result.

BRIEF DESCRIPTION OF THE DRAWING FIGURES

4

Figure 4:
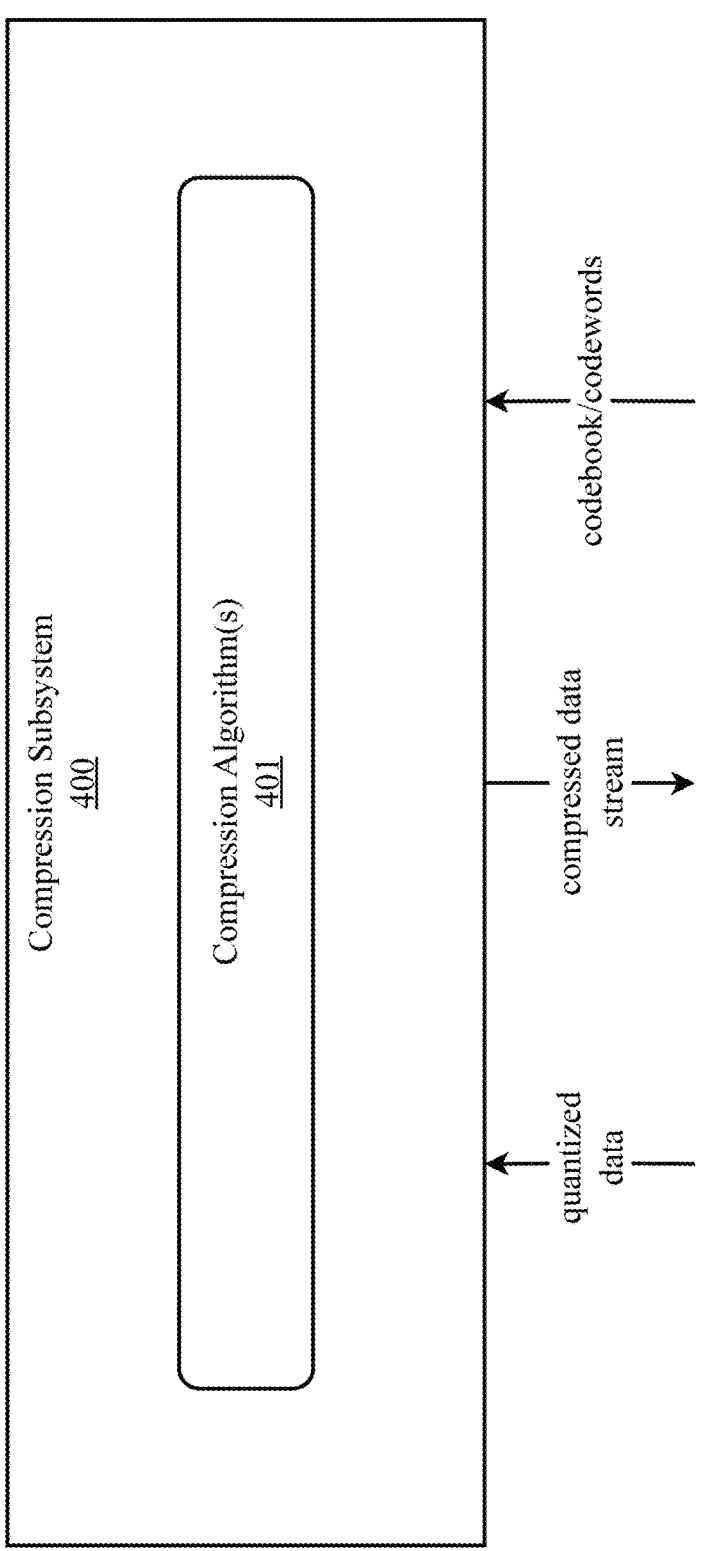

FIG. 4 is a block diagram illustrating an exemplary aspect of a system for codebook-based homomorphic encryption, a compression subsystem.

Figure 5:
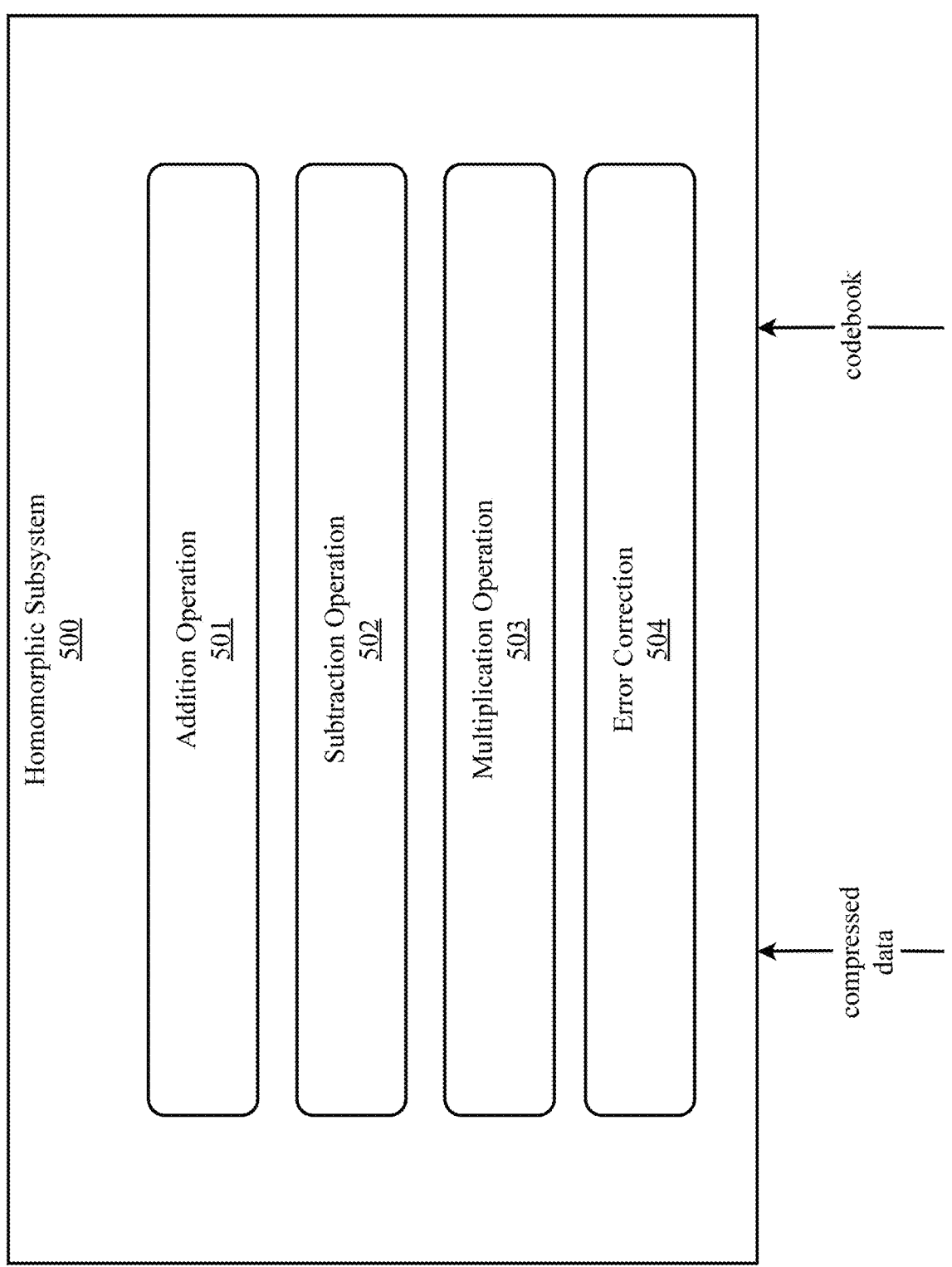

FIG. 5 is a block diagram illustrating an exemplary aspect of a system for codebook-based homomorphic encryption, a homomorphic subsystem.

Figure 6:
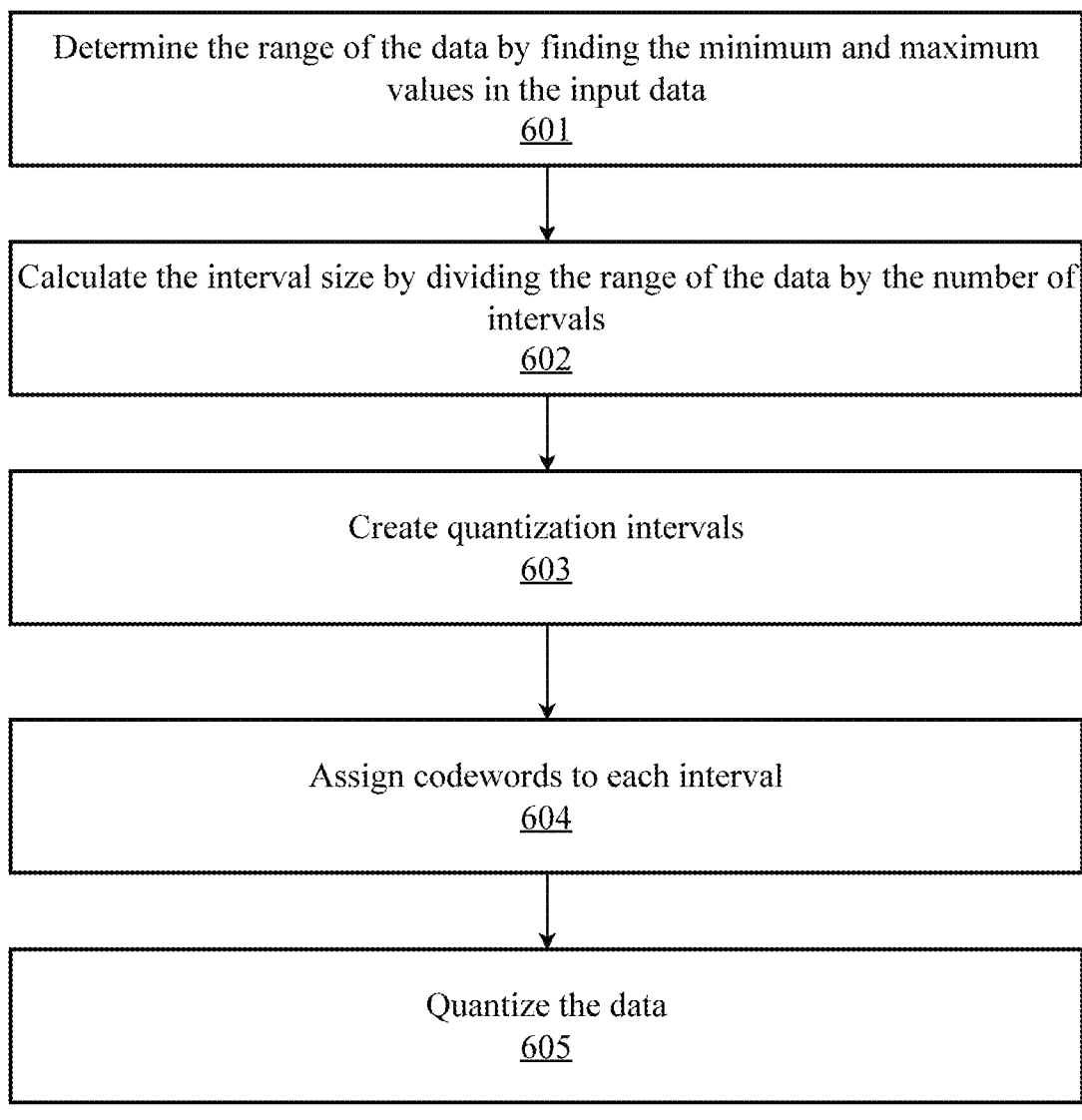

FIG. 6 is a flow diagram illustrating an exemplary method for performing data quantization on input data, according to an aspect.

Figure 7:
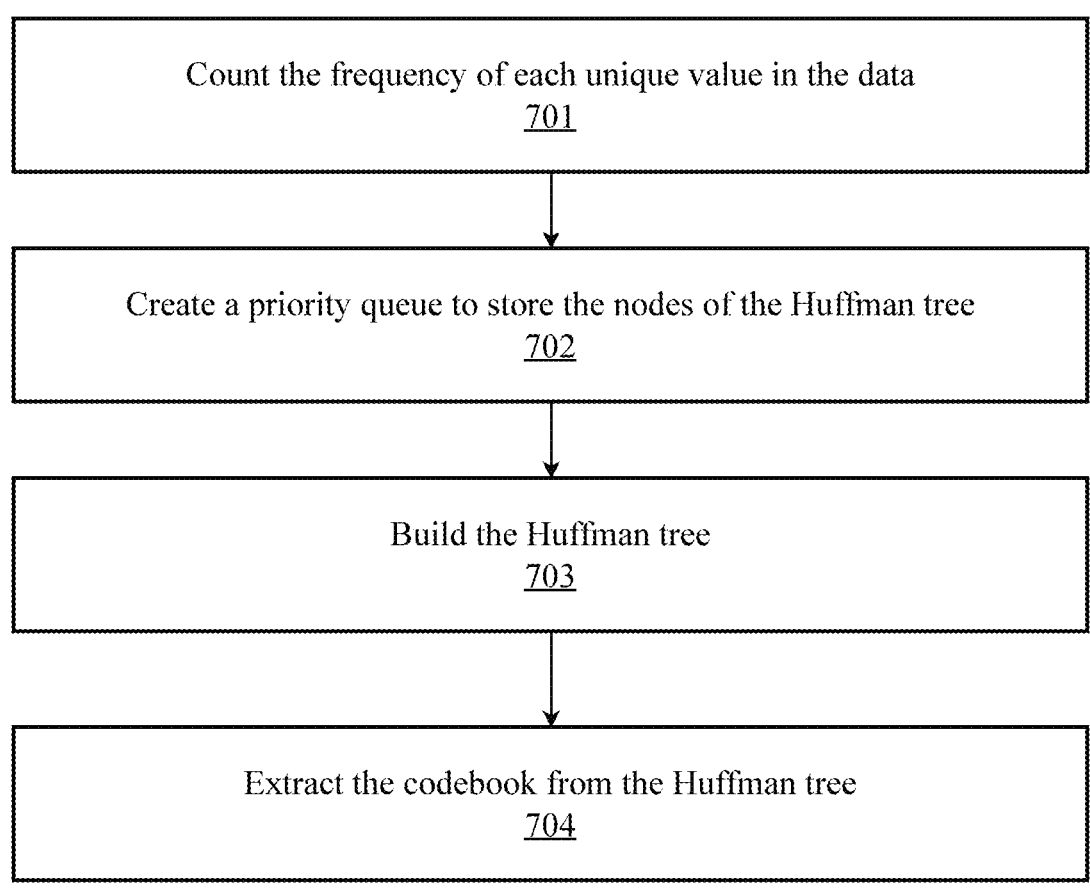

FIG. 7 is a flow diagram illustrating an exemplary method for performing codebook generation using Huffman coding, according to an aspect.

Figure 8:
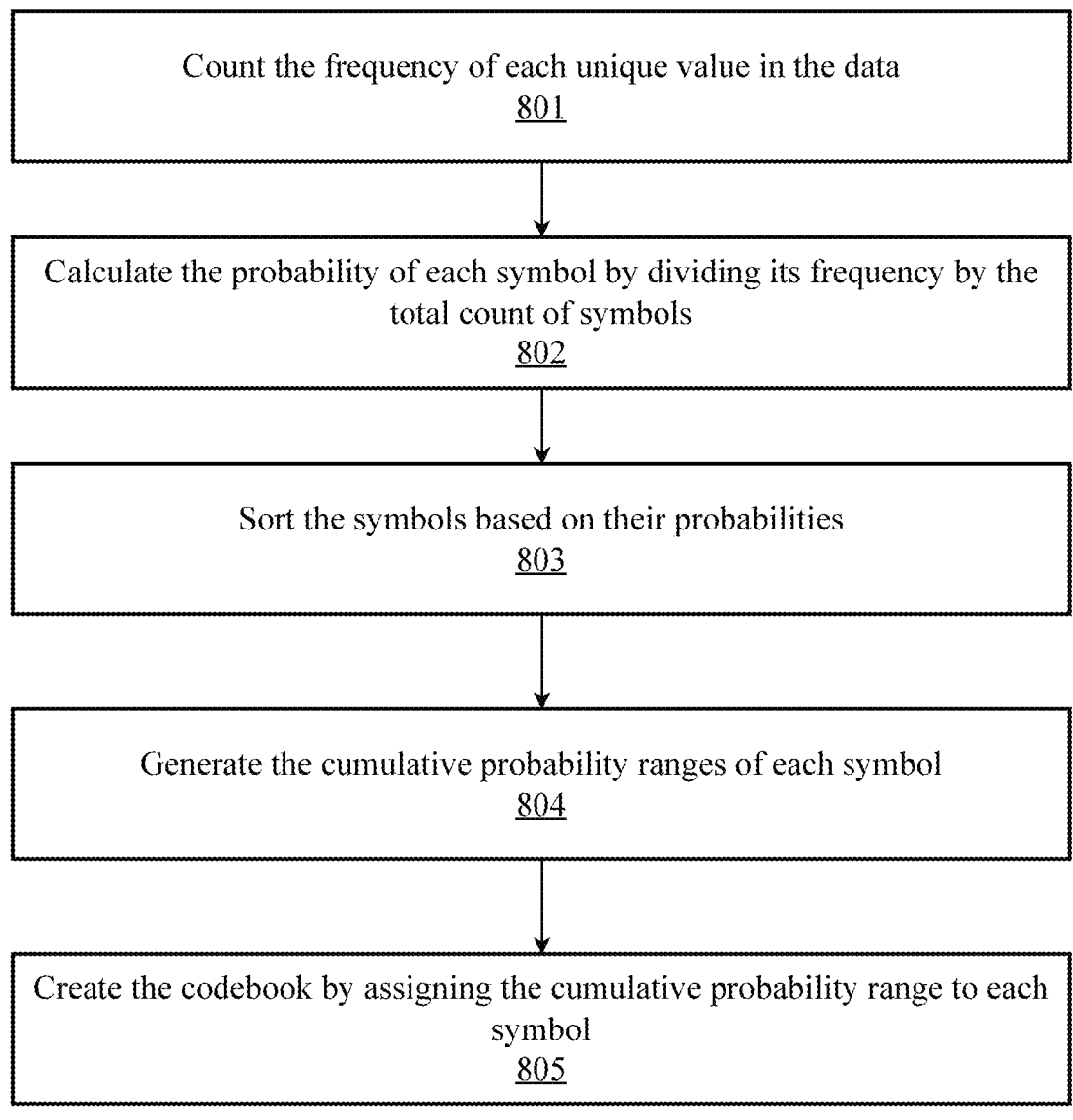

FIG. 8 is a flow diagram illustrating an exemplary method for performing codebook generation using arithmetic coding, according to an aspect.

Figure 9:
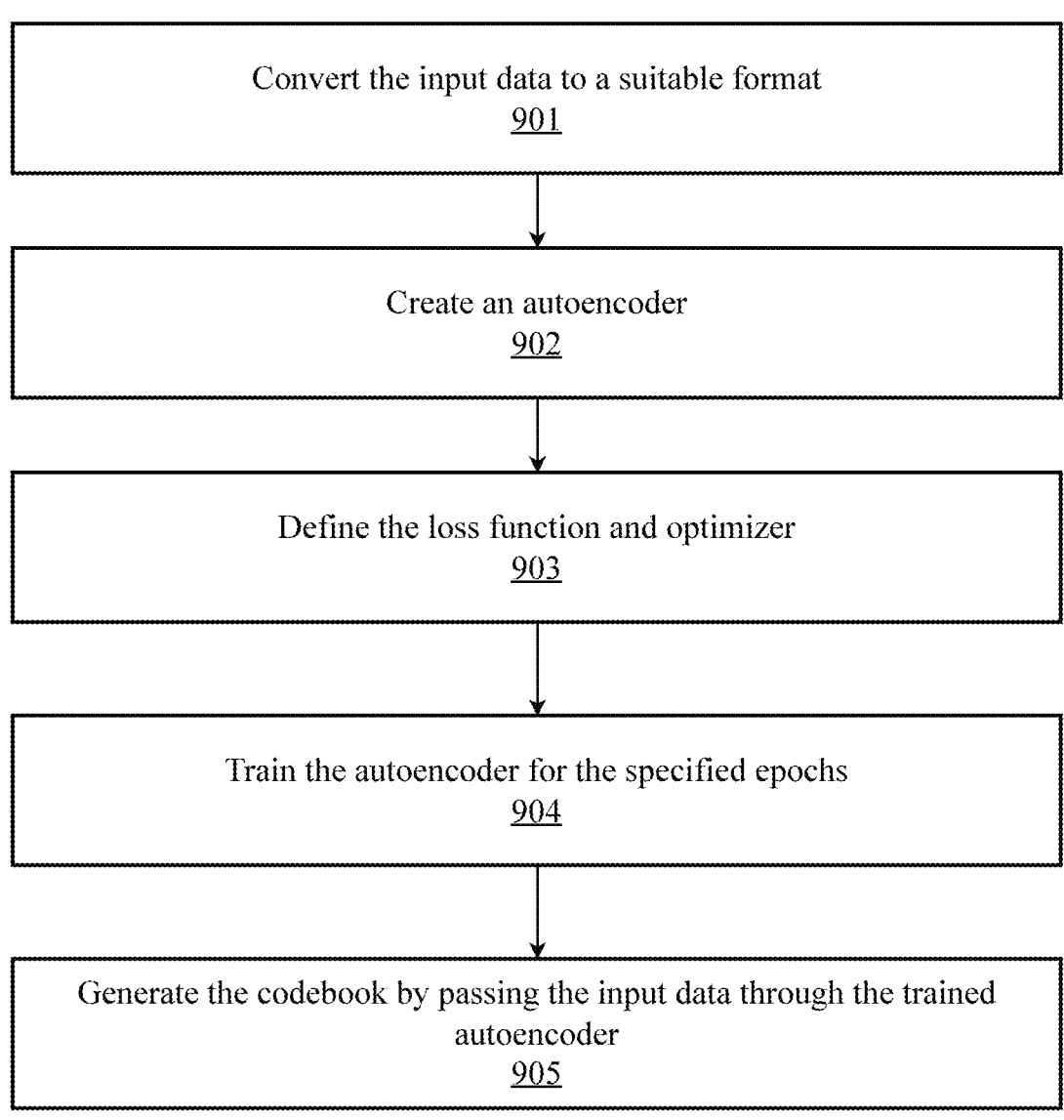

FIG. 9 is a flow diagram illustrating an exemplary method for performing codebook generation using a deep learning model, according to an aspect.

Figure 10:
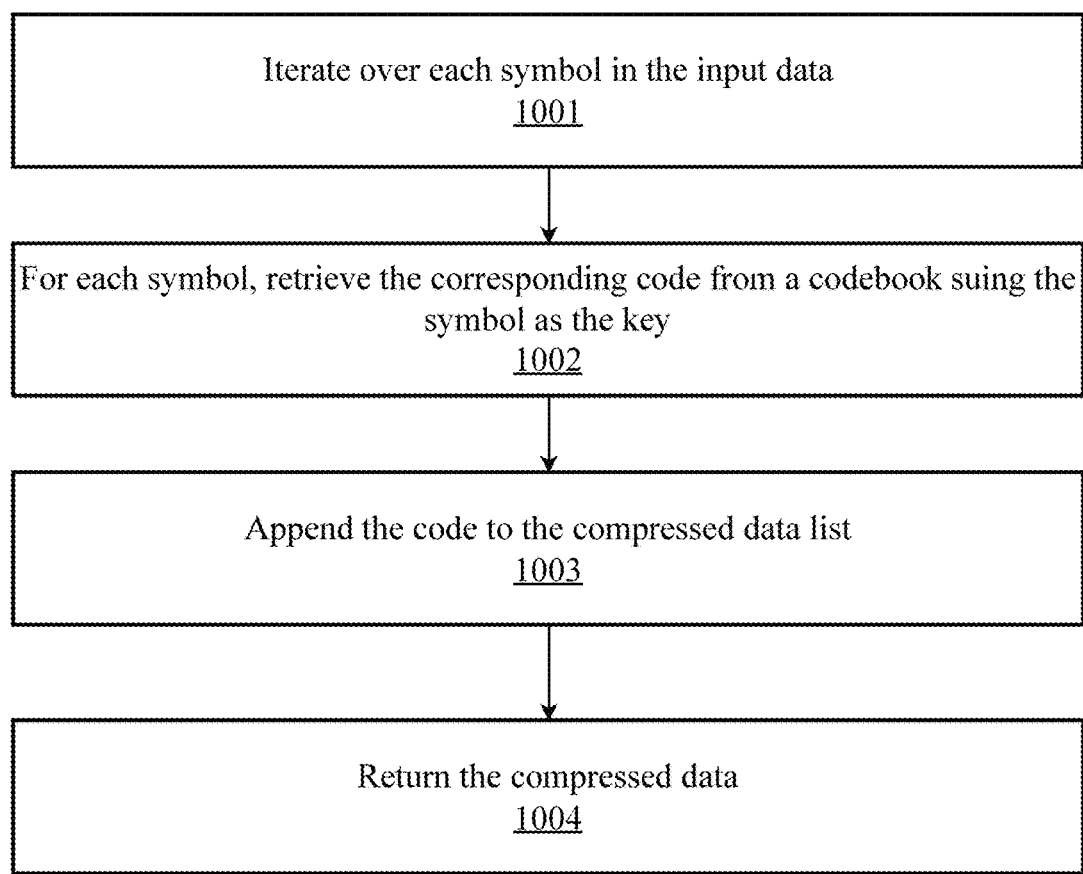
Figure 10:

FIG. 10 is a flow diagram illustrating an exemplary method for performing compression using the generation codebooks, according to an aspect.

Figure 11:
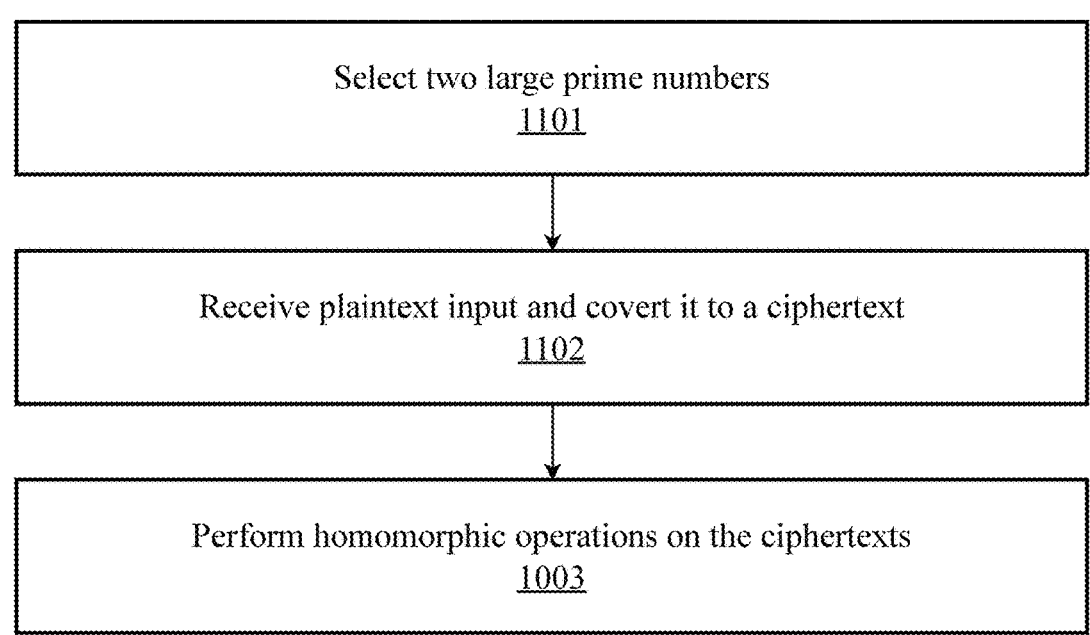

FIG. 11 is a flow diagram illustrating an exemplary method for performing homomorphic encryption using the Paillier cryptosystem, according to an aspect.

Figure 12:
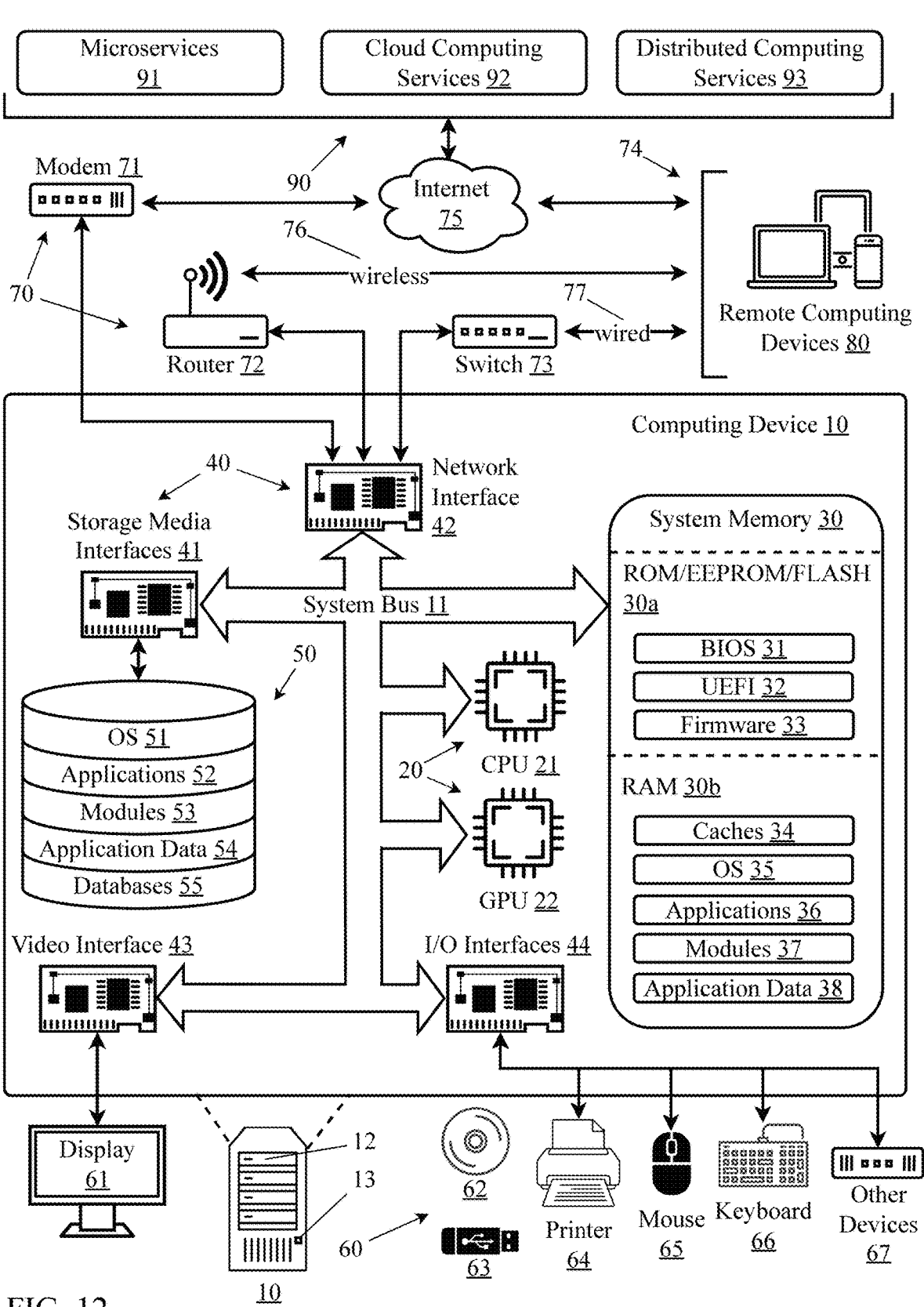

FIG. 12 illustrates an exemplary computing environment on which an embodiment described herein may be implemented.

DETAILED DESCRIPTION OF THE INVENTION

The inventor has conceived, and reduced to practice, a system and method for codebook-based homomorphic encryption that combines data compression and homomorphic encryption to enable efficient and secure computation on compressed data. It involves quantizing the input data, generating an optimized codebook using techniques like Huffman coding or deep learning, and compressing the data by replacing each value with its corresponding codeword. The compressed data is then encrypted using a homomorphic encryption scheme, such as the Paillier cryptosystem, allowing computations to be performed directly on the encrypted compressed data without decryption. Homomorphic properties of the encryption scheme enable operations like addition and multiplication on the ciphertexts, while preserving the confidentiality of the underlying data. The system also incorporates error correction techniques to mitigate the impact of quantization and encryption on the accuracy of the computations. This approach combines the benefits of data compression and homomorphic encryption, enabling efficient storage, transmission, and secure computation on compressed data.

The system addresses the intersection of data compression and homomorphic computation, seeking to develop a novel approach that combines the benefits of both domains. By enabling homomorphic operations on compressed data, the system aims to achieve efficient and privacy-preserving processing of large-scale datasets, such as those encountered in IoT, cloud computing, and data analytics applications.

According to various embodiments, the system may encompass various techniques and methods related to data compression, including entropy coding (e.g., Huffman coding, arithmetic coding), dictionary-based compression (e.g., LZ77, LZ78), and transform-based compression (e.g., discrete cosine transform, wavelet transform). It may also utilize the study of homomorphic encryption schemes, such as fully homomorphic encryption (FHE) and somewhat homomorphic encryption (SHE), which enable computations on encrypted data.

Furthermore, the supports the use of secure multi-party computation (MPC), which allows multiple parties to jointly compute a function on their private inputs without revealing the inputs to each other. The system focuses on enabling computations on compressed data has implications for secure MPC protocols, as it can potentially reduce the communication and computational overhead associated with processing large amounts of data.

The codebook-based homomorphic compression system lies at the intersection of these subfields, aiming to develop a novel technique that combines the principles of data compression, homomorphic encryption, and secure computation. By advancing the state of the art in these areas, the system seeks to enable more efficient, scalable, and privacy-preserving processing of data in various applications, contributing to the broader field of secure and efficient data management.

The codebook-based homomorphic compression system has numerous applications across various domains, particularly in scenarios where data compression and privacy-preserving computations are crucial. Some key applications and advantages include: Internet of Things (IoT), Privacy-Preserving Data Analytics, Secure Cloud Computing, Efficient Data Transmission, and Secure Data Storage.

IoT devices generate massive amounts of data that need to be efficiently transmitted and processed. The disclosed system enables compression of IoT data streams while allowing for homomorphic operations, reducing bandwidth requirements and enabling privacy-preserving analytics on the compressed data. For example, in a smart city scenario, sensors can compress traffic data using the system, and the compressed data can be aggregated and analyzed without revealing individual sensor readings.

The system enables analytics to be performed on compressed data without requiring access to the original uncompressed data. This is particularly advantageous in scenarios where sensitive or confidential data needs to be analyzed while maintaining privacy. For instance, in healthcare, patient data can be compressed using the system, and researchers can perform statistical analysis or machine learning on the compressed data without accessing individual patient records.

Cloud computing often involves storing and processing large amounts of data on remote servers. The system allows data to be compressed before uploading to the cloud, reducing storage and bandwidth costs. Moreover, the homomorphic properties of the compression enable computations to be performed on the compressed data in the cloud, without the need for decryption, enhancing data security and privacy. For example, an e-commerce platform can compress customer data using the system and perform analytics on the compressed data in the cloud, ensuring customer privacy.

The system can achieve significant data compression ratios, reducing the size of the data that needs to be transmitted over networks. This is particularly beneficial in scenarios where bandwidth is limited or costly, such as wireless sensor networks or satellite communications. By compressing the data using the system, more data can be transmitted using the same bandwidth, improving efficiency and reducing transmission costs.

The system enables data to be stored in a compressed format while still allowing for homomorphic operations. This reduces storage requirements and enhances data security, as the compressed data can be stored without revealing the original content. For instance, in a cloud storage scenario, user files can be compressed using the system before being stored in the cloud, ensuring data confidentiality and reducing storage costs.

The codebook-based homomorphic compression system offers significant advantages in terms of data compression, privacy-preserving computations, and efficient data transmission and storage. It enables organizations to process and analyze data in a secure and efficient manner, opening up new possibilities for data-driven insights and decision-making while preserving data privacy.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

As used herein, "homomorphic encryption" refers to a form of encryption that allows computations to be carried out on ciphertext, thus generating an encrypted result that, when decrypted, matches the result of the operations as if they had been performed on the plaintext. In other words, it enables computation on encrypted data without decrypting it first. This property is valuable for privacy-preserving computation, as it allows for secure outsourcing of data processing while keeping the data encrypted.

Conceptual Architecture

Figure 1:
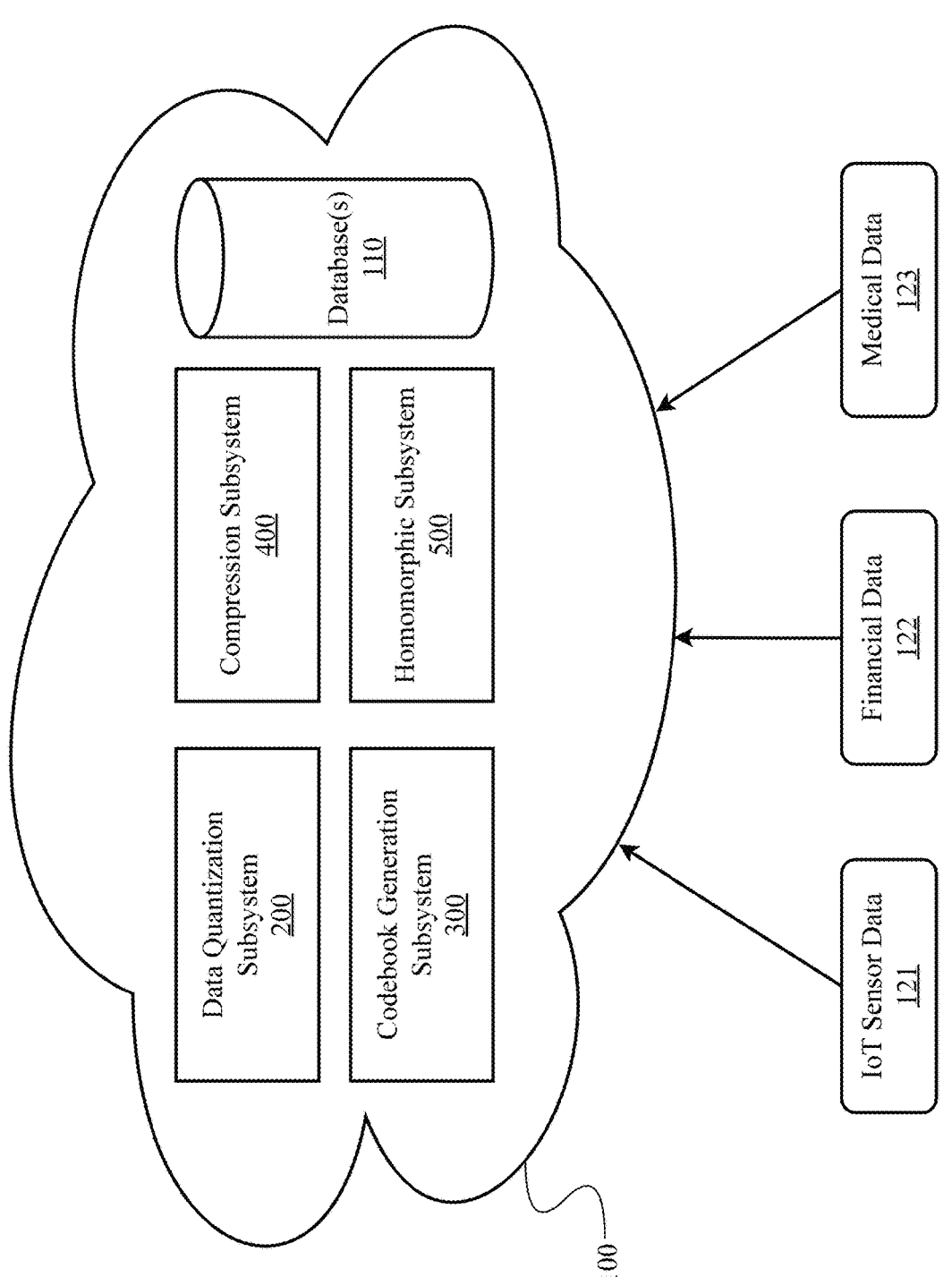
FIG. 1 is a block diagram illustrating an exemplary system architecture for codebook-based homomorphic encryption, according to an embodiment.

FIG. 1 is a block diagram illustrating an exemplary system architecture for codebook-based homomorphic encryption 100, according to an embodiment. According to the embodiment, system 100 is configured as a cloud-based computing platform comprising various system or subsystem components configured to provide functionality directed to the execution of codebook-based homomorphic encryption. Exemplary platform subsystems can include a data quantization subsystem 200, a codebook generation subsystem 300, a compression subsystem 400, and a homomorphic subsystem 500. In some embodiments, systems 200-500 may each be implemented as standalone software applications or as a services/microservices architecture which can be deployed (via platform 100) to perform a specific task or functionality. In such an arrangement, services can communicate with each other over an appropriate network using lightweight protocols such as HTTP, gRPC, or message queues. This allows for asynchronous and decoupled communication between services. Services may be scaled independently based on demand, which allows for better resource utilization and improved performance. Services may be deployed using containerization technologies such as Docker and orchestrated using container orchestration platforms like Kubernetes. This allows for easier deployment and management of services.

As shown the system may comprise one or more databases and/or data storage systems 110 configured to store a plurality of data such as, quantized data, codewords and codebooks, compressed data, machine learning and/or deep learning algorithms/models, model training data, schemas, rules, policies, preferences, and/or the like. Examples of the types of databases that may be implemented include, but are not limited to, graph databases, vector databases, relational databases, document databases, key-value databases, distributed key-value stores, time series databases, NoSQL databases, in memory databases, and cloud-based storage systems.

The system 100 may process and homomorphically encrypt various types of input data. Some examples of the types of input data that can be processed include, but are not limited to, Internet-of-Things (IoT) sensor data 121, financial data 122, and medical data 123.

According to an embodiment, data quantization subsystem 200 is present and configured for dividing the range of the input data into a finite set of intervals, each represented by a unique codeword. The quantization process discretizes the continuous or high-precision input data into a smaller set of discrete values, reducing the complexity and size of the data representation. The number and size of the intervals can be determined based on the desired trade-off between compression ratio and approximation accuracy. Various quantization techniques can be employed, such as uniform quantization, where the intervals are of equal size, or non-uniform quantization, where the interval sizes vary based on the data distribution. The output of the quantization step is a mapping between the original input data and the corresponding codewords, which serves as the basis for the subsequent codebook generation and compression steps in the homomorphic compression pipeline.

According to an embodiment, codebook generation subsystem 300 is present and responsible for creating a compact and efficient representation of the quantized data. It involves assigning unique codewords to each interval of the quantized data based on a selected codebook generation technique. The choice of the codebook generation technique depends on factors such as the desired compression ratio, the complexity of the data, and the efficiency of the encoding and decoding processes. Common techniques include Huffman coding, which assigns shorter codewords to more frequent intervals and longer codewords to less frequent intervals, and arithmetic coding, which represents the entire dataset as a single fractional number. Other advanced techniques, such as entropy-based coding or machine learning-based approaches, can also be employed to generate optimized codebooks. The resulting codebook is a mapping between the quantized intervals and their corresponding codewords, enabling efficient compression and decompression of the data while preserving the essential information for subsequent homomorphic operations.

According to an embodiment, compression subsystem 400 is present and configured for efficiently encoding the quantized data using the generated codebook. It may comprise replacing each quantized interval in the input data with its corresponding codeword from the codebook. This process significantly reduces the size of the data representation, as the codewords are typically much shorter than the original data values. The compression is achieved by exploiting the redundancy and patterns present in the quantized data, with more frequent intervals being assigned shorter codewords and less frequent intervals being assigned longer codewords. The output of the compression step is a compressed representation of the original data, where each data point is replaced by its corresponding codeword. This compressed representation is compact and efficient, enabling faster transmission, storage, and processing of the data. The compression step may be lossless, meaning that the original quantized data can be perfectly reconstructed from the compressed representation using the codebook, ensuring data integrity and enabling accurate homomorphic operations on the compressed data.

According to an embodiment, homomorphic subsystem 500 is present and configured for enabling computation directly on the compressed data without the need for decompression. It leverages the properties of homomorphic encryption schemes to perform operations such as addition, subtraction, and multiplication on the compressed codewords, while preserving the confidentiality and integrity of the underlying data. The homomorphic component allows for the execution of various algorithms and analysis techniques on the compressed data, without revealing the original sensitive information. This is achieved by exploiting the mathematical structure of the codebook and the homomorphic encryption scheme, ensuring that the results of the homomorphic operations on the codewords correspond to the same operations on the original uncompressed data. The homomorphic component enables privacy-preserving computation and reduces the computational overhead associated with traditional encryption-decryption cycles. It opens up possibilities for secure and efficient data processing in various domains, such as cloud computing, multi-party computation, and privacy-preserving machine learning, while maintaining the confidentiality and integrity of the data throughout the computation process.

Figure 2:
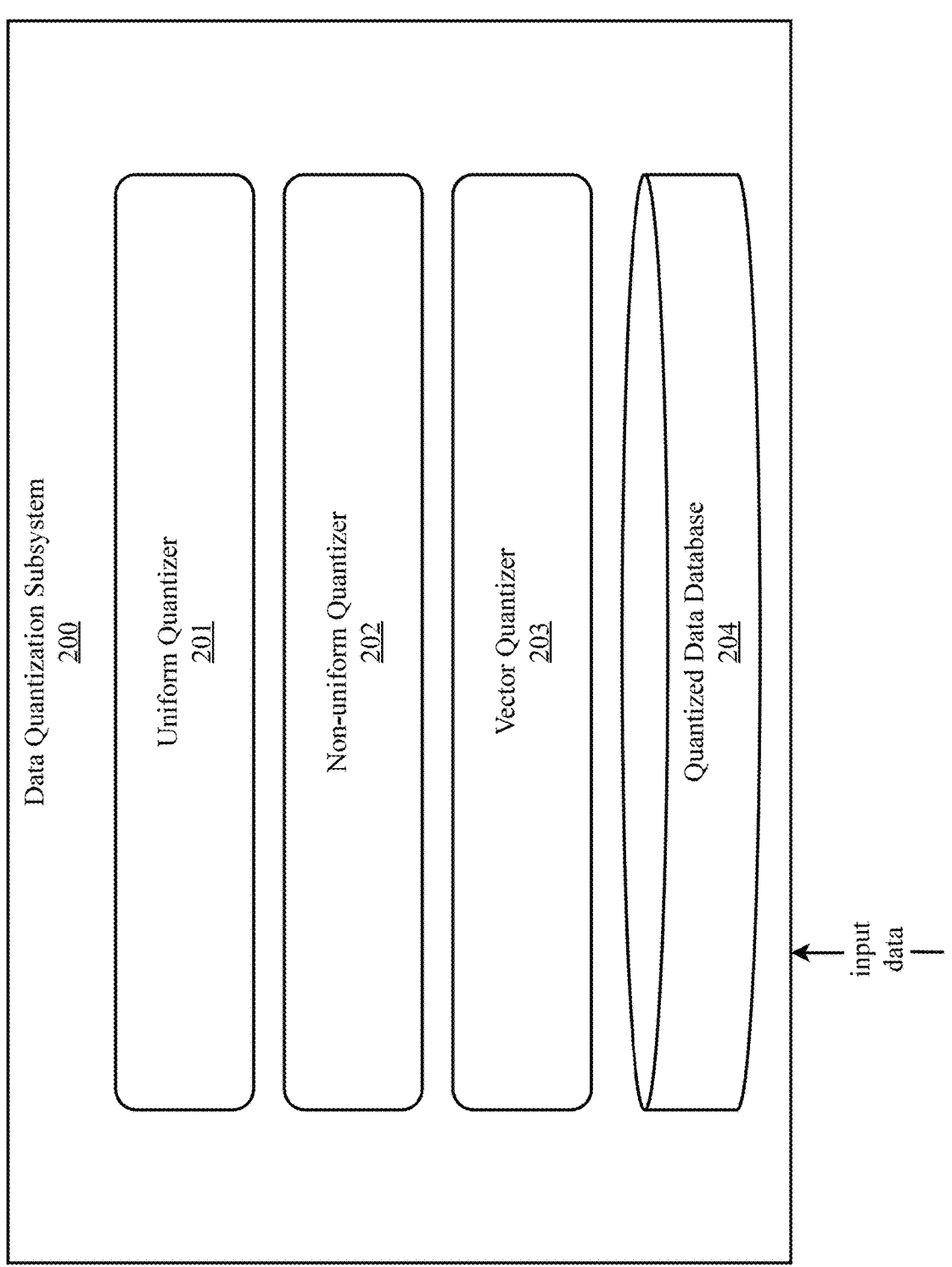
FIG. 2 is a block diagram illustrating an exemplary aspect of a system for codebook-based homomorphic encryption, a data quantization subsystem.

FIG. 2 is a block diagram illustrating an exemplary aspect of a system for codebook-based homomorphic encryption, a data quantization subsystem. According to the aspect, data quantization subsystem 200 is configured to divide a data range into fixed-size intervals and assigning codes to each interval using various data quantization techniques.

Quantization is the process of mapping a continuous range of values to a discrete set of values. In the context of codebook-based homomorphic compression, quantization may be used to discretize the input data into a finite set of intervals, each represented by a unique code. The quantization process comprises dividing the range of the input data into fixed-size intervals. The size of the intervals determines the granularity of the quantization and affects the trade-off between compression ratio and approximation accuracy. Smaller intervals lead to higher accuracy but may result in a larger codebook and lower compression ratios, while larger intervals achieve better compression but introduce more approximation error. There are various quantization techniques that can be employed, depending on the nature of the data and the desired properties. According to the embodiment, a uniform quantizer 201 component is present. In uniform quantization, the data range is divided into intervals of equal size. Each interval is assigned a unique code, typically an integer value. For example, if the data range is [0, 100] and it is divided into 10 intervals, each interval would have a size of 10, and the codes would be {0, 1, 2, . . . , 9}.

According to the embodiment, a non-uniform quantizer component 202 is present. Non-uniform quantization allows for intervals of varying sizes, adapting to the distribution of the data. This can be beneficial when the data has a non-uniform distribution, as it allows for more precise representation of frequently occurring values. One common approach is logarithmic quantization, where the interval sizes increase logarithmically, providing more precision for smaller values and less precision for larger values. c.

According to the embodiment, a vector quantizer component 203 is present. Vector quantization extends the concept of quantization to multi-dimensional data. Instead of quantizing individual scalar values, vector quantization operates on vectors or blocks of data. The data is divided into fixed-size vectors, and each vector is mapped to the nearest codeword in a predefined codebook. Vector quantization can exploit correlations and patterns within the data, leading to more efficient compression.

As an example of the data quantization process consider an example of quantizing temperature data from an IoT sensor. The temperature values range from −10° C. to 50° C. Data quantization subsystem 200 can apply uniform quantization by dividing this range into 20 intervals, each of size 3° C. The intervals and their corresponding codes would be:

Interval 1: [−10,−7), Code: 0

Interval 2: [−7,−4), Code: 1

. . .

Interval 20: [47, 50], Code: 19

A temperature value of 25.6° C. would be quantized to the interval [25, 28) and assigned the code 11.

Quantized data may be stored in a quantized data database 204 which may be implemented as one or more appropriate data storage systems. There are several database systems and data storage solutions that can be used to store the quantized data in the codebook-based homomorphic compression system. The choice of the storage system depends on factors such as the volume of data, the required retrieval and query performance, scalability needs, and the overall system architecture. In some implementations, relational databases, such as MySQL, PostgreSQL, or Oracle, may be used for structured data storage. They provide a table-based structure where data is organized into rows and columns, with each table representing a specific entity or concept. In the context of storing quantized data, relational databases can be used to store the quantized values along with their corresponding metadata, such as timestamps, sensor IDs, or other relevant attributes. The quantized data can be stored in a table with columns representing the quantized values and associated metadata. Relational databases offer strong consistency, ACID (Atomicity, Consistency, Isolation, Durability) properties, and support for complex queries using SQL (Structured Query Language). They are suitable for scenarios where data integrity, structured queries, and transactions are important.

In some implementations, NoSQL (Not Only SQL) databases may be utilized. NoSQL databases are designed to handle large volumes of unstructured or semi-structured data. They provide flexible schemas and can scale horizontally to accommodate growing data sizes. Examples of NoSQL databases include MongoDB, Cassandra, and Apache HBase. For storing quantized data, NoSQL databases can be used to store the quantized values as key-value pairs, documents, or wide-column families. The quantized data can be stored alongside its associated metadata, allowing for efficient retrieval and querying. NoSQL databases offer high scalability, distributed architecture, and eventual consistency. They are well-suited for scenarios where scalability, high write throughput, and flexible data models are prioritized over strict consistency and complex querying capabilities.

Time series databases may be implemented and are optimized for storing and querying time-stamped data, making them suitable for storing quantized data that is generated over time, such as sensor readings or IoT data. Examples of time series databases include InfluxDB, TimescaleDB, and OpenTSDB. In a time series database, the quantized data can be stored as data points with timestamps. Each data point represents a quantized value at a specific time. Time series databases provide efficient indexing and querying capabilities based on time ranges, allowing for fast retrieval and analysis of quantized data over specific time intervals. Time series databases offer features such as data compression, downsampling, and aggregation, which can be beneficial for storing and querying large volumes of time-stamped quantized data.

Distributed file systems, such as Hadoop Distributed File System (HDFS) or Amazon S3, provide scalable and fault-tolerant storage for large-scale data. They are designed to store and process massive amounts of unstructured or semi-structured data across a cluster of commodity servers. For storing quantized data, distributed file systems can be used to store the quantized values as files or objects. The quantized data can be organized in a hierarchical directory structure based on timestamps, sensor IDs, or other relevant attributes. Distributed file systems offer high scalability, fault tolerance, and the ability to process data using distributed computing frameworks like Apache Hadoop or Apache Spark. Distributed file systems are suitable for scenarios where the quantized data volume is extremely large, and the data needs to be processed using distributed computing techniques.

In-memory databases store data primarily in the main memory (RAM) of the system, providing extremely fast read and write operations. Examples of in-memory databases include Redis, Apache Ignite, and VoltDB. For storing quantized data, in-memory databases can be used to store the quantized values in key-value pairs or data structures optimized for fast retrieval. In-memory databases offer low latency and high throughput, making them suitable for scenarios where real-time processing and fast data access are critical. In-memory databases can be used as a caching layer or as a primary storage solution for quantized data, depending on the specific requirements of the system.

Cloud storage services, such as Amazon S3, Google Cloud Storage, or Microsoft Azure Blob Storage, provide scalable and durable storage solutions for various types of data. They offer virtually unlimited storage capacity and high availability. For storing quantized data, cloud storage can be used to store the quantized values as objects or files. The quantized data can be organized in a hierarchical structure using object prefixes or directories. Cloud storage services provide features like versioning, replication, and access control, ensuring data durability and security. Cloud storage is suitable for scenarios where the quantized data needs to be stored and accessed remotely, and the system requires scalability and durability provided by cloud infrastructure.

These are just a few examples of database systems and data storage solutions that could be used to store the quantized data in the codebook-based homomorphic compression system. The choice of the storage system depends on the specific requirements of the application, such as data volume, retrieval performance, scalability needs, and the overall system architecture.

Figure 3:
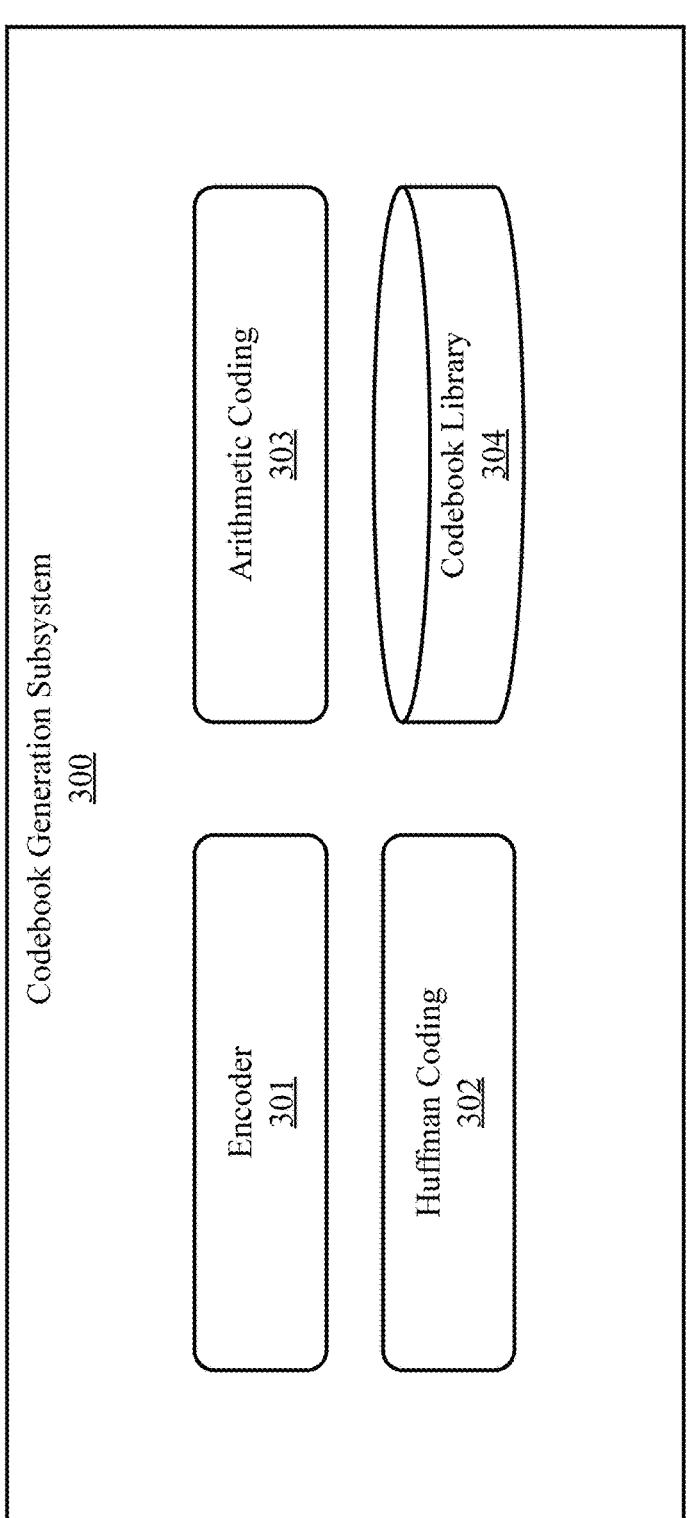
FIG. 3 is a block diagram illustrating an exemplary aspect of a system for codebook-based homomorphic encryption, a codebook generation subsystem.

FIG. 3 is a block diagram illustrating an exemplary aspect of a system for codebook-based homomorphic encryption, a codebook generation subsystem. According to the aspect, codebook generation subsystem 300 is configured to generate one or more codebooks for a collection of input data using various techniques, such as Huffman coding or arithmetic coding.

The codebook is an important component of the codebook-based homomorphic compression system. According to the embodiment, it is a collection of codewords, where each codeword corresponds to a specific interval in the quantized data. The codebook may generated based on the frequency distribution of the quantized data, assigning shorter codewords to more frequently occurring intervals and longer codewords to less frequent intervals. There are several techniques for generating the codebook, with the goal of minimizing the average codeword length while maintaining the uniqueness of the codewords. Two common techniques are Huffman coding 302 and arithmetic coding 303. Huffman coding 302 is a variable-length coding technique that assigns codewords based on the frequency of occurrence of each symbol (interval). It constructs a binary tree, known as the Huffman tree, where each leaf node represents a symbol and the path from the root to the leaf determines the codeword. More frequent symbols are assigned shorter codewords, while less frequent symbols receive longer codewords. Huffman coding guarantees an optimal prefix code, meaning no codeword is a prefix of any other codeword. For example, consider the quantized temperature data from the previous example. Let's say the frequency distribution of the intervals is as follows:

Interval 0: 5%
Interval 1: 10%
Interval 2: 20%
Interval 3: 15%
Interval 4: 50%

Using Huffman coding, the subsystem 300 can generate the following codebook:

Interval 0: 1100
Interval 1: 101
Interval 2: 00
Interval 3: 01
Interval 4: 11

The most frequent interval (Interval 4) receives the shortest codeword (11), while the least frequent interval (Interval 0) receives the longest codeword (1100).

Arithmetic coding 303 is another entropy coding technique that assigns codewords to intervals based on their probability distribution. Unlike Huffman coding, arithmetic coding does not assign fixed codewords to symbols. Instead, it represents the entire message as a single fractional number between 0 and 1. The interval [0, 1) is recursively divided based on the probabilities of the symbols, and the final codeword is a binary fraction that falls within the subinterval corresponding to the entire message. Arithmetic coding achieves near-optimal compression rates but requires more computational complexity compared to Huffman coding.

For example, using the same quantized temperature data and frequency distribution as before, arithmetic coding would assign subintervals to each symbol based on their probabilities:

Interval 0: [0.00, 0.05)
Interval 1: [0.05, 0.15)
Interval 2: [0.15, 0.35)
Interval 3: [0.35, 0.50)
Interval 4: [0.50, 1.00)

To encode a message sequence like [Interval 4, Interval 2, Interval 1], arithmetic coding would recursively subdivide the interval [0, 1) based on the probabilities of the symbols, resulting in a final subinterval. The codeword would be a binary fraction that lies within this final subinterval.

According to an embodiment, an encoder component 301 is present and configured to implement one or more deep learning techniques for generating codewords for quantized data. Deep learning techniques can be employed to generate effective codewords for the quantized data. One approach is to use deep learning-based autoencoder models to learn compact and meaningful representations of the quantized data. Autoencoders are neural network architectures that consist of an encoder and a decoder, where the encoder learns to compress the input data into a lower-dimensional latent space, and the decoder reconstructs the original data from the latent representation.

Here are a few exemplary deep learning encoding techniques that can be implemented for creating codewords of the quantized data, according to an embodiment. Convolutional autoencoders (CAEs) leverage convolutional neural networks (CNNs) in the encoder and decoder parts of the autoencoder. CNNs are particularly effective in capturing spatial dependencies and hierarchical features in data, making them well-suited for encoding structured data such as images or time series. In the context of the codebook-based homomorphic compression, a CAE can be trained on the quantized data. The encoder part of the CAE learns to compress the quantized data into a compact latent representation, which serves as the codeword. The decoder part learns to reconstruct the quantized data from the codeword. As an example, consider an example of using a CAE for encoding quantized sensor data. The quantized data is represented as a 2D matrix, where each row corresponds to a sensor reading, and each column represents a time step. The CAE encoder consists of convolutional layers followed by pooling layers, which gradually reduce the spatial dimensions of the input and extract meaningful features. The output of the encoder is a compact latent representation, which serves as the codeword. The CAE decoder consists of upsampling layers and convolutional layers, which reconstruct the original quantized data from the codeword.

Another form of deep learning coding includes recurrent autoencoders (RAEs). Recurrent autoencoders utilize recurrent neural networks (RNNs) in the encoder and decoder parts of the autoencoder. RNNs are well-suited for processing sequential data, such as time series or natural language, as they can capture temporal dependencies and context. In codebook-based homomorphic compression, an RAE can be used to encode quantized sequential data. The encoder part of the RAE consists of recurrent layers, such as Long Short-Term Memory (LSTM) or Gated Recurrent Unit (GRU) layers, which process the input sequence and generate a fixed-length latent representation, serving as the codeword. The decoder part of the RAE takes the codeword and reconstructs the original quantized sequence. For example, consider an example of using an RAE for encoding quantized audio data. The quantized audio signal is represented as a sequence of amplitude values. The RAE encoder consists of LSTM layers that process the input sequence and generate a fixed-length latent representation, which serves as the codeword. The RAE decoder, also consisting of LSTM layers, takes the codeword and reconstructs the original quantized audio sequence.

Another form of deep learning coding includes variational autoencoders (VAEs). Variational autoencoders extend the concept of autoencoders by introducing a probabilistic framework. VAEs learn to encode the input data into a probability distribution in the latent space, rather than a single point. The encoder part of the VAE learns to map the input data to the parameters of a probability distribution (e.g., mean and variance of a Gaussian distribution), and the decoder part learns to reconstruct the original data from samples drawn from this distribution. In codebook-based homomorphic compression, a VAE can be used to generate codewords that capture the underlying probability distribution of the quantized data. The encoder part of the VAE learns to map the quantized data to the parameters of a probability distribution in the latent space. The codewords are then obtained by sampling from this distribution. The decoder part of the VAE learns to reconstruct the original quantized data from the sampled codewords. Consider an example of using a VAE for encoding quantized image data. The quantized images are fed into the VAE encoder, which learns to map each image to the parameters of a Gaussian distribution in the latent space. The codewords are obtained by sampling from this distribution. The VAE decoder takes the sampled codewords and reconstructs the original quantized images.

Another form of deep learning coding includes deep belief networks (DBNs). Deep Belief Networks are generative models that consist of multiple layers of restricted Boltzmann machines (RBMs). DBNs can learn hierarchical representations of the input data by training each layer in an unsupervised manner, followed by fine-tuning the entire network using supervised learning. In codebook-based homomorphic compression, DBNs can be used to generate codewords that capture the hierarchical structure of the quantized data. The DBN is trained on the quantized data, and the activations of the hidden layers serve as the codewords. The hierarchical nature of DBNs allows for capturing complex patterns and dependencies in the data. Consider an example of using a DBN for encoding quantized text data. The quantized text is represented as a binary vector, where each element corresponds to the presence or absence of a specific word. The DBN is trained on the quantized text data, and the activations of the hidden layers serve as the codewords. The DBN learns to capture the hierarchical structure and semantic relationships in the text data.

These are just a few examples of deep learning encoding techniques that can be explored for creating codewords of the quantized data in the codebook-based homomorphic compression system. The choice of the specific deep learning architecture depends on the nature of the data and the desired properties of the codewords. It's important to note that the deep learning encoding process should be designed to generate codewords that are suitable for homomorphic operations. The codewords should exhibit certain properties, such as being compatible with the homomorphic encryption scheme's plaintext space and allowing for efficient homomorphic computations.

During the training process of the deep learning models, the objective function should be designed to capture the desired properties of the codewords, such as minimizing the reconstruction error while ensuring the codewords are suitable for homomorphic operations. Additionally, regularization techniques can be employed to encourage sparsity or other desirable properties in the codewords. Once the deep learning models are trained, the encoder part can be used to generate codewords for new quantized data. The generated codewords can then be used in the codebook-based homomorphic compression scheme, enabling efficient and privacy-preserving computations on the compressed data.

Experimental evaluation and performance analysis can be conducted to assess the effectiveness of the deep learning encoding techniques in generating codewords that achieve good compression ratios, maintain low approximation errors, and enable efficient homomorphic operations. The choice of the deep learning architecture and hyperparameters can be fine-tuned based on the specific requirements and characteristics of the data.

According to the aspect, a codebook library 304 is present and configured to store a plurality of codewords (i.e., a codebook) generated by one or more of the techniques described herein. When it comes to storing the codewords and codebook in the codebook-based homomorphic compression system, several database systems and data storage solutions can be considered. The choice of the storage system depends on factors such as the size of the codebook, the frequency of updates, the retrieval and query requirements, and the overall system architecture. In some implementations key-value stores may be used, Key-value stores are a type of NoSQL database that provide a simple and efficient way to store and retrieve data based on a unique key. Examples of key-value stores include Redis, Memcached, and Amazon DynamoDB. For storing the codewords and codebook, key-value stores can be used to store each codeword as a key-value pair, where the key represents the codeword, and the value represents the corresponding data or metadata associated with the codeword. The codebook can be stored as a collection of key-value pairs, allowing for fast retrieval of codewords based on their keys. Key-value stores offer high performance, low latency, and scalability, making them suitable for scenarios where fast retrieval of codewords is critical.

Document databases, such as MongoDB or Couchbase, store data as flexible, semi-structured documents in formats like JSON or BSON. They provide a schema-less design and allow for easy modification of the data structure. For storing the codewords and codebook, document databases can be used to store each codeword as a document, along with its associated data or metadata. The codebook can be stored as a collection of documents, where each document represents a codeword and its related information. Document databases offer flexibility in terms of data structure, allowing for easy addition or modification of codeword attributes. They also provide querying capabilities based on document fields, enabling efficient retrieval of codewords based on specific criteria.

Relational databases, such as MySQL, PostgreSQL, or Oracle, can also be used to store the codewords and codebook. In a relational database, the codewords can be stored in a table with columns representing the codeword and its associated data or metadata. The codebook can be stored in a separate table, with each row representing a codeword and its corresponding information. Relational databases provide structured querying capabilities using SQL, allowing for efficient retrieval and filtering of codewords based on specific conditions. Relational databases offer strong consistency, ACID properties, and support for complex queries, making them suitable for scenarios where data integrity and structured querying are important.

Graph databases, such as Neo4j or Amazon Neptune, store data as nodes and edges in a graph structure. They are designed to efficiently handle complex relationships and connections between data entities. For storing the codewords and codebook, graph databases can be used to represent the relationships between codewords and their associated data or metadata. Each codeword can be represented as a node in the graph, with edges connecting related codewords or linking codewords to their corresponding data. Graph databases provide efficient traversal and querying capabilities based on the graph structure, allowing for fast retrieval of connected codewords and exploration of relationships between codewords.

Distributed key-value stores, such as Apache Cassandra or Apache HBase, are designed to handle large-scale data and provide high scalability and fault tolerance. They distribute data across multiple nodes in a cluster, allowing for horizontal scaling. For storing the codewords and codebook, distributed key-value stores can be used to store codewords as key-value pairs, similar to regular key-value stores. The codebook can be partitioned and distributed across multiple nodes in the cluster, enabling high scalability and performance. Distributed key-value stores offer eventual consistency, high write throughput, and the ability to handle large volumes of data, making them suitable for scenarios where scalability and fault tolerance are critical.

FIG. 4 is a block diagram illustrating an exemplary aspect of a system for codebook-based homomorphic encryption, a compression subsystem. According to the aspect, compression subsystem 400 is configured to perform a process of replacing each quantized data values with its corresponding code form the codebook.

According to an embodiment, the compression process may involve replacing each quantized data value with its corresponding codeword from the generated codebook. This process achieves data compression by representing the original data using a compact representation. A compression algorithm 401 traverses the quantized data and looks up the codeword for each interval in the codebook. The codewords are then concatenated to form the compressed data stream. The resulting compressed data has a reduced size compared to the original data, as the codewords are typically shorter than the original data values. The compression ratio, which is the ratio of the size of the compressed data to the size of the original data, depends on the distribution of the data and the effectiveness of the codebook. A well-designed codebook that assigns shorter codewords to more frequent intervals will result in higher compression ratios. As an example, the subsystem 400 may compress a sequence of quantized temperature values using the Huffman codebook generated in the previous example. Consider the following sequence of quantized intervals: [Interval 4, Interval 2, Interval 1, Interval 4, Interval 3, Interval 2, Interval 4]. Using the Huffman codebook, the compression algorithm can replace each interval with its corresponding codeword: [11, 00, 101, 11, 01, 00, 11]. The compressed data stream would be: 11000101110100011. The original data consisted of 7 intervals, each requiring at least 3 bits to represent (since there are 5 intervals). The compressed data stream has a length of 17 bits, achieving a compression ratio of approximately 0.81 (17 bits/21 bits).

Some exemplary compression algorithms that may be implemented in various embodiments of the system can include, but are not limited to, Huffman coding, arithmetic coding, run-length encoding (RLE), Lempel-Ziv-Welch (LZW) compression, discrete cosine transform (DCT) compression, and wavelet compression. These are just a few examples of compression algorithms that could be used in the compression process of the codebook-based homomorphic compression system. The choice of the specific compression algorithm depends on the nature of the data, the desired compression ratio, the acceptable level of information loss (if any), and the computational complexity constraints.

Run-length encoding is a simple lossless compression algorithm that replaces consecutive occurrences of the same symbol with a single instance of the symbol followed by a count of the number of occurrences. RLE is particularly effective for datasets with long runs of repeated symbols. For example, consider a quantized dataset: "AAAABBBBCCCCDDDD". Using RLE, the compressed data would be: "A4B4C4D4". Each symbol is replaced by the symbol itself followed by the count of consecutive occurrences.

LZW compression is a dictionary-based lossless compression algorithm that builds a dictionary of previously seen patterns in the data. It starts with a predefined dictionary containing single symbols and progressively adds new entries to the dictionary as it encounters new patterns. Each new pattern is represented by a reference to the dictionary entry, resulting in a compressed representation of the data. As an example, consider a quantized dataset: "ABAB-CABCDABCDE". Using LZW compression, the dictionary would be built as follows: Dictionary: {A: 1, B: 2, C: 3, D: 4, E: 5}. The compressed data would be: "1, 2, 1, 2, 3, 1, 2, 3, 4, 1, 2, 3, 4, 5". Each new pattern encountered is added to the dictionary, and the compressed data consists of references to the dictionary entries.

DCT compression is a lossy compression algorithm commonly used in image and video compression. It transforms the data from the spatial domain to the frequency domain using the discrete cosine transform. In the frequency domain, the high-frequency components, which often correspond to less perceptually significant information, can be discarded or quantized more aggressively, resulting in compression. For example, consider a quantized image block of size 8×8 pixels. The DCT is applied to the block, transforming it into the frequency domain. The resulting DCT coefficients are then quantized based on a predefined quantization matrix. The quantized coefficients are further compressed using entropy coding techniques like Huffman coding or arithmetic coding. The compressed data consists of the quantized DCT coefficients along with the necessary metadata for reconstruction.

Wavelet compression is another lossy compression algorithm that uses wavelet transforms to decompose the data into different frequency sub-bands. The wavelet coefficients in each sub-band are then quantized and encoded, resulting in a compressed representation. Wavelet compression is effective for compressing signals and images with localized features and discontinuities. As an example, consider a quantized 1D signal. The wavelet transform is applied to the signal, decomposing it into different frequency sub-bands. The wavelet coefficients in each sub-band are quantized based on a predefined quantization scheme. The quantized coefficients are then encoded using entropy coding techniques. The compressed data consists of the quantized wavelet coefficients along with the necessary metadata for reconstruction.

FIG. 5 is a block diagram illustrating an exemplary aspect of a system for codebook-based homomorphic encryption, a homomorphic subsystem. According to the aspect, homomorphic subsystem 500 is enables homomorphic operations (e.g., addition, subtraction, averaging, etc.) directly on the compressed data.

According to the embodiment, the codebook-based homomorphic compression system enables homomorphic operations, such as addition, subtraction, and multiplication, to be performed directly on the compressed data without the need for decompression. This property allows for efficient and privacy-preserving computations on the compressed data.

To enable homomorphic operations, the system can leverage the properties of the codebook and the quantization scheme. One method is to perform the desired operation on the codewords and then map the result back to the corresponding interval in the codebook. According to an aspect, to add two compressed values, the homomorphic addition operation 501 is performed on their corresponding codewords. The result is then mapped back to the nearest interval in the codebook. For example, the subsystem adds two compressed temperature values using the Huffman codebook from the previous examples. Value 1: Interval 4 (Codeword: 11) and Value 2: Interval 2 (Codeword: 00). To perform homomorphic addition, the subsystem 500 add the corresponding codewords: 11+00=11 (binary addition). The result (11) is then mapped back to the nearest interval in the codebook, which is Interval 4. Thus, the homomorphic addition of Interval 4 and Interval 2 yields Interval 4.

According to an aspect, homomorphic subtraction 502 follows a similar process, where the codewords are subtracted, and the result is mapped back to the nearest interval in the codebook. As an example, the subsystem subtracts two compressed temperature values. Value 1: Interval 4 (Codeword: 11) and Value 2: Interval 1 (Codeword: 101). Homomorphic subtraction: 11−101=−10 (binary subtraction). The result (−10) is mapped back to the nearest interval in the codebook, which is Interval 1. Thus, the homomorphic subtraction of Interval 4 and Interval 1 yields Interval 1.

According to an aspect, homomorphic multiplication 503 comprises multiplying the codewords and mapping the result back to the nearest interval in the codebook. However, multiplication in the codeword domain may lead to a result that lies outside the range of the codebook. To handle this, the system can employ techniques such as codeword extension or scaling, according to some embodiments. For example, the subsystem multiplies two compressed temperature values. Value 1: Interval 2 (Codeword: 00) and Value 2: Interval 3 (Codeword: 01). Homomorphic multiplication: 00*01=0000 (binary multiplication). The result (0000) is mapped back to the nearest interval in the codebook, which is Interval 0. Thus, the homomorphic multiplication of Interval 2 and Interval 3 yields Interval 0. Note that homomorphic multiplication may introduce more approximation errors compared to addition and subtraction due to the limitations of the codebook range. The homomorphic operations 501-503 in the codebook-based homomorphic compression system allow for computations to be performed directly on the compressed data, eliminating the need for decompression, and enabling privacy-preserving computations. However, it's important to note that the accuracy of the homomorphic operations depends on the quantization scheme and the codebook design. In some implementations, the system may introduce approximation errors, especially for operations like multiplication, which can be mitigated through careful codebook construction and error correction techniques.

Error correction techniques 504 may be used in improving the accuracy and reliability of homomorphic operations, especially multiplication, in the codebook-based homomorphic compression system. Homomorphic multiplication often introduces higher levels of approximation errors compared to addition and subtraction due to the limitations of the codebook and the inherent properties of the encryption scheme. Some error correction techniques that could be applied to enhance the performance of homomorphic multiplication include, but are not limited to, Residue Number System (RNS), error correction codes, bootstrapping, iterative refinement, and codebook optimization.

The Residue Number System is a numerical representation system that can be used to reduce the approximation errors in homomorphic multiplication. In RNS, a number is represented by its residues modulo a set of pairwise coprime moduli. Homomorphic operations are performed independently on each residue, and the results are combined using the Chinese Remainder Theorem (CRT) to obtain the final result. The RNS representation helps to distribute the approximation errors across multiple residues, reducing the overall error in the homomorphic multiplication. By carefully selecting the moduli set and the encoding scheme, the approximation errors can be minimized, and the accuracy of homomorphic multiplication can be improved. For example, consider a numerical value x that needs to undergo homomorphic multiplication. Instead of directly operating on x, it is encoded using RNS with a set of moduli $\{m1, m2, m3\}$. The homomorphic multiplication is performed independently on each residue: x mod m1=x1, x mod m2=x2, x mod m3=x3. The homomorphic multiplication results (y1, y2, y3) are then combined using CRT to obtain the final result y. The RNS representation helps to distribute the approximation errors across the residues, reducing the overall error in the homomorphic multiplication.

Error correction codes, such as Reed-Solomon codes, Bose-Chaudhuri-Hocquenghem (BCH) codes, or Golay codes may be implemented to detect and correct errors introduced during homomorphic multiplication. These codes add redundancy to the data, enabling the detection and correction of a certain number of errors. In the context of homomorphic multiplication, the error correction codes can be applied to the codewords or the intermediate results. By encoding the codewords or results with an appropriate error correction code, the system can detect and correct errors that may arise due to the approximations introduced by the codebook and the homomorphic encryption scheme. As an example, consider a codeword c that undergoes homomorphic multiplication. Before the multiplication, the codeword is encoded using a Reed-Solomon code, adding redundancy. The encoded codeword c' is then used in the homomorphic multiplication. After the homomorphic multiplication, the resulting codeword d' may contain errors due to approximations. The Reed-Solomon decoder is applied to d', detecting and correcting any errors within its error correction capability. The corrected codeword d is then obtained, improving the accuracy of the homomorphic multiplication result.

Bootstrapping is a technique used in fully homomorphic encryption (FHE) schemes to refresh the ciphertext and reduce the accumulated noise. In the context of the codebook-based homomorphic compression system, bootstrapping can be adapted to reduce the approximation errors introduced by homomorphic multiplication. The idea is to perform a homomorphic decryption followed by a homomorphic re-encryption of the intermediate result. This process helps to reduce the accumulated approximation errors and maintain the accuracy of the homomorphic multiplication. Consider a homomorphic multiplication operation, for example, that results in a ciphertext c with accumulated approximation errors. The bootstrapping process is applied to c as follows: homomorphically decrypt c to obtain the intermediate plaintext result p; apply error correction techniques (e.g., rounding, truncation) to p to reduce the approximation errors; and Homomorphically re-encrypt the corrected plaintext p' to obtain a refreshed ciphertext c'. The refreshed ciphertext c' has reduced approximation errors, improving the accuracy of the homomorphic multiplication result.

Iterative refinement is a technique that can be used to improve the accuracy of homomorphic multiplication by iteratively refining the result. The idea is to perform the homomorphic multiplication multiple times, each time using the previous result as input and applying error correction techniques to reduce the approximation errors. Consider a homomorphic multiplication operation, for example, between ciphertexts a and b. The iterative refinement process can be applied as follows: perform the homomorphic multiplication to obtain the initial result c1=a*b; apply error correction techniques (e.g., rounding, truncation) to c1 to obtain a corrected result c1; use c1' as input for the next iteration, performing the homomorphic multiplication again: c2=c1'*b; and repeat steps 2-3 for a fixed number of iterations or until a desired level of accuracy is achieved. Each iteration helps to refine the result and reduce the approximation errors, improving the accuracy of the homomorphic multiplication.

The design and optimization of the codebook used in the homomorphic compression system can also contribute to reducing approximation errors in homomorphic multiplication. By carefully constructing the codebook and selecting the codewords, the system can minimize the impact of approximations on the multiplication results. Techniques such as vector quantization, lattice-based codebooks, or learning-based codebook generation can be implemented to create codebooks that are more resilient to approximation errors and provide better accuracy in homomorphic multiplication. For example, consider a codebook optimization technique that aims to minimize the approximation errors in homomorphic multiplication. The codebook may be constructed using a learning-based approach, where a neural network is trained to generate codewords that minimize the approximation errors when multiplied homomorphically. The training process may comprise multiplying codewords homomorphically and comparing the results with the actual multiplication results. The neural network is optimized to generate codewords that minimize the difference between the homomorphic multiplication results and the actual results. The resulting codebook is more resilient to approximation errors and provides improved accuracy in homomorphic multiplication.

These error correction techniques 504 can be applied individually or in combination to enhance the accuracy and reliability of homomorphic operations in the codebook-based homomorphic compression system. The specific choice of techniques depends on the characteristics of the data, the desired level of accuracy, and the computational constraints of the system.

Detailed Description of Exemplary Aspects

FIG. 6 is a flow diagram illustrating an exemplary method for performing data quantization on input data, according to an aspect. According to the aspect, the quantization method takes the input data and the desired number of quantization intervals as parameters. It begins at step 601 by determining the range of the data by finding the minimum and maximum values in the input data. Then, at step 602 it calculates the interval size by dividing the range of the data by the number of intervals, ensuring that the intervals are of equal size. As a next step 603, the process creates the quantization intervals. Each interval is represented as a tuple containing the starting value and the ending value of the interval. The intervals are stored in a list. After that, the method assigns codewords to each interval at step 604. In this example, the codewords are simply integers ranging from 0 to the number of intervals minus 1. The codewords are stored in a separate list. The method then proceeds to quantize the data at step 605. It iterates over each value in the input data and finds the corresponding interval it belongs to. It assigns the codeword of the matching interval to the quantized data. If a value falls outside the range of the intervals, the method assigns the codeword of the last interval. Finally, the method returns three outputs: the quantized representation of the input data, the list of quantization intervals, and the list of assigned codewords.

To use the quantization method, the system (or a user) can provide the input data and the desired number of quantization intervals. The method will return the quantized data, along with the quantization intervals and codewords, which can be used for further processing or analysis. For example, if you have input data [0.2, 0.5, 0.8, 1.2, 1.5, 1.8, 2.2, 2.5] and you want to quantize it into 4 intervals, the system can call the quantization method with these parameters. The method will quantize the data and return the quantized representation [0, 1, 1, 2, 2, 3, 3, 3], along with the quantization intervals [(0.2, 0.7), (0.7, 1.2), (1.2, 1.7), (1.7, 2.2)] and the codewords [0, 1, 2, 3].

FIG. 7 is a flow diagram illustrating an exemplary method for performing codebook generation using Huffman coding, according to an aspect. According to the aspect, the codebook generation method takes the input data as a parameter. It begins at step 701 by counting the frequency of each unique value in the data using a frequency counter. This step creates a dictionary where the keys are the unique values, and the values are their corresponding frequencies. As a next step 702, the method creates a priority queue to store the nodes of the Huffman tree. Each node is represented as a list containing the frequency and the symbol-code pair. The symbol-code pair consists of the unique value and an empty string as a placeholder for the Huffman code. The priority queue is initialized with the frequency-symbol pairs and heapified to maintain the priority order based on the frequencies. The process then proceeds to build the Huffman tree at step 703. It repeatedly extracts the two nodes with the lowest frequencies from the priority queue. It assigns the code '0' to the symbols in the left node and '1' to the symbols in the right node. The frequencies of the left and right nodes are combined, and a new node is created with the combined frequencies and the updated symbol-code pairs. The new node is pushed back into the priority queue. This process continues until there is only one node left in the priority queue, representing the root of the Huffman tree. At this point, the Huffman tree is complete, and each symbol has been assigned a unique Huffman code. As a last step 704, the method extracts the codebook from the Huffman tree. It traverses the remaining node in the priority queue and creates a dictionary where the keys are the unique values, and the values are their corresponding Huffman codes. The codebook represents the mapping between the symbols and their assigned codes. The generated codebook is then returned as the output of the method.

To use the codebook generation method, the system (or a user) can provide the input data as a parameter. The method will process the data, build the Huffman tree, and generate the codebook based on the frequency distribution of the symbols. The resulting codebook assigns shorter codes to more frequent symbols and longer codes to less frequent symbols, achieving efficient compression. For example, if the input data comprises [0, 1, 1, 2, 2, 2, 3, 3, 3, 3], the system can call the codebook generation method with this data. The method will generate a codebook that maps each unique value to its corresponding Huffman code. In this case, the codebook may look something like:

0:000
    1:001
    2:01
    3:1

The generated codebook can then be used to compress the input data by replacing each symbol with its corresponding Huffman code, resulting in a compressed representation of the data.

FIG. 8 is a flow diagram illustrating an exemplary method for performing codebook generation using arithmetic coding, according to an aspect. According to the aspect, the codebook generation method using arithmetic coding takes the input data as a parameter. It begins at step 801 by counting the frequency of each unique value in the data using a frequency counter. This step creates a dictionary where the keys are the unique symbols, and the values are their corresponding frequencies. As a next step 802, the method calculates the probability of each symbol by dividing its frequency by the total count of symbols in the data. The probabilities may be stored in a dictionary where the keys are the symbols, and the values are their corresponding probabilities. The method then sorts the symbols based on their probabilities in ascending order at step 803. This step ensures that the symbols are arranged in increasing order of their probabilities, which is necessary for generating the cumulative probability ranges. After sorting the symbols, the method generates the cumulative probability ranges for each symbol at step 804. It iterates over the sorted symbols and calculates the cumulative probability range for each symbol. The cumulative probability range represents the interval [lower_bound, upper_bound) assigned to each symbol based on its probability. The lower bound of the range is the cumulative probability of all the symbols preceding the current symbol, and the upper bound is the cumulative probability up to and including the current symbol. The cumulative ranges may be stored in a dictionary where the keys are the symbols, and the values are their corresponding cumulative probability ranges. As a last step 805, the method creates the codebook by assigning the cumulative probability range to each symbol. The codebook is represented as a dictionary where the keys are the symbols, and the values are their corresponding cumulative probability ranges. The generated codebook is then returned as the output of the method.

To use the codebook generation method with arithmetic coding, the system (or a user) can provide the input data as a parameter. The method will process the data, calculate the probabilities of each symbol, sort the symbols based on their probabilities, generate the cumulative probability ranges, and create the codebook. The resulting codebook assigns a cumulative probability range to each symbol based on its probability of occurrence in the data. The generated codebook can then be used to compress the input data using arithmetic coding. The compression process comprises recursively subdividing the interval [0, 1) based on the probabilities of the symbols, and the final compressed code is a single fraction that lies within the subinterval corresponding to the entire sequence of symbols.

FIG. 9 is a flow diagram illustrating an exemplary method for performing codebook generation using a deep learning model, according to an aspect. According to the aspect, the codebook generation method using deep learning takes the input data, desired codebook size, number of training epochs, and learning rate as parameters. It begins at step 901 by preparing the data by converting it into a suitable format, such as a PyTorch tensor, to be used as input to the deep learning model. Next, the method creates an autoencoder model at step 902, which consists of an encoder and a decoder. The encoder is responsible for mapping the input data to a lower-dimensional codebook space, while the decoder reconstructs the original data from the codebook representation. The architecture of the autoencoder can be adjusted based on the specific requirements of the problem, such as the input dimensionality, hidden layer sizes, and activation functions. The method then defines the loss function and optimizer for training the autoencoder at step 903. Common choices for the loss function include Mean Squared Error (MSE) or Mean Absolute Error (MAE), which measure the reconstruction error between the original data and the reconstructed data. The optimizer, such as Adam or Stochastic Gradient Descent (SGD), is used to update the model parameters during training.

At step 904 the autoencoder is trained for the specified number of epochs. In each epoch, the method performs a forward pass through the autoencoder, passing the input data through the encoder to obtain the codebook representation and then through the decoder to reconstruct the original data. The reconstruction loss is calculated using the chosen loss function, and a backward pass is performed to compute the gradients of the loss with respect to the model parameters. The optimizer is then used to update the model parameters based on the gradients, with the goal of minimizing the reconstruction loss. During training, the method can print the loss at regular intervals (e.g., every 100 epochs) to monitor the progress and convergence of the autoencoder. The training process aims to find the optimal set of parameters that minimize the reconstruction error, effectively learning a compact and meaningful codebook representation of the input data.

After training, the process generates the codebook by passing the input data through the trained encoder at step 905. The output of the encoder represents the codebook, where each data point is mapped to a lower-dimensional representation in the codebook space. The generated codebook captures the essential features and patterns in the input data, enabling efficient compression and reconstruction. The codebook generation method using deep learning offers a powerful and flexible approach to learn a compact and meaningful representation of the data. By leveraging the capabilities of deep neural networks, such as autoencoders, the method can automatically discover and extract relevant features from the input data, resulting in a codebook that captures the underlying structure and patterns.

The autoencoder-based approach has several advantages. It can handle high-dimensional and complex data, learn non-linear transformations, and adapt to various data types and distributions. Additionally, the autoencoder can be trained in an unsupervised manner, without requiring labeled data, making it applicable to a wide range of datasets and domains.

FIG. 10 is a flow diagram illustrating an exemplary method for performing compression using the generation codebooks, according to an aspect. According to the aspect, the compression method takes the input data and the generated codebook as parameters. The codebook is a mapping that associates each unique symbol in the input data with a corresponding code. The purpose of the compression method is to replace each symbol in the input data with its corresponding code from the codebook, resulting in a compressed representation of the data. The process begins at step 1001 by initializing an empty list called "compressed_data" to store the compressed representation of the input data. It then iterates over each symbol in the input data, one symbol at a time. For each symbol, the method retrieves the corresponding code from the codebook using the symbol as the key at step 1002. The codebook may be implemented as a dictionary or a hash map, allowing for efficient lookup of codes based on the symbols. At step 1003, once the code for a symbol is retrieved, it is appended to the "compressed_data" list. This process is repeated for each symbol in the input data until all symbols have been processed. After iterating over all the symbols, the "compressed_data" list contains the compressed representation of the input data, where each symbol has been replaced by its corresponding code from the codebook. As a last step 1004, the method returns the "compressed_data" list as the output, representing the compressed version of the input data.

The compression method achieves data compression by replacing the symbols in the input data with shorter codes, effectively reducing the size of the data. The effectiveness of the compression depends on the quality of the codebook and the distribution of symbols in the input data. A well-designed codebook assigns shorter codes to frequently occurring symbols and longer codes to less frequent symbols, resulting in a more compact representation of the data. The compressed data can be stored or transmitted more efficiently due to its reduced size.

However, to reconstruct the original data from the compressed representation, a decompression step is necessary. Decompression involves mapping the codes back to their corresponding symbols using the same codebook used during compression.

FIG. 11 is a flow diagram illustrating an exemplary method for performing homomorphic encryption using the Paillier cryptosystem, according to an aspect. According to the aspect, the homomorphic encryption method uses the Paillier cryptosystem, which allows computations to be performed on encrypted data without decrypting it first. The Paillier cryptosystem is based on the properties of modular arithmetic and relies on the difficulty of the decisional composite residuosity assumption. The homomorphic encryption scheme, such as the Paillier cryptosystem, can be implemented with the codebook-based compressed data. The idea is to encrypt the compressed data using the homomorphic encryption scheme, allowing computations to be performed on the encrypted compressed data without decrypting it first.

To begin, the Paillier cryptosystem requires the selection of two large prime numbers, p and q, which form the basis of the encryption scheme at step 1101. These prime numbers are used to compute the public key n as the product of p and q, and the private key 1 as (p−1)*(q−1). Additionally, a generator g is chosen, typically set to n+1. The encryption process takes a plaintext message as input and converts it into a ciphertext at step 1102. To encrypt a message using the Paillier cryptosystem, a random value r is generated between 1 and n−1. The ciphertext c is then computed using the formula: $c = (g^{message} * r^n) \mod n^2$. This encryption process ensures that the ciphertext is indistinguishable from random values and provides semantic security.

To decrypt a ciphertext and retrieve the original plaintext message, the private key 1 and a precomputed value mu (the modular multiplicative inverse of 1 modulo n) are used. The decryption formula is: $m = ((ciphertext^1 \mod n^2) - 1) / n * mu \mod n$. This process reverts the encryption operation and recovers the original plaintext message.

One of the key features of the Paillier cryptosystem is its homomorphic properties, which allow computations to be performed on encrypted data. The scheme supports homomorphic addition and multiplication.

At step 1103, the system performs homomorphic operations on the ciphertext data. To perform homomorphic addition, two ciphertexts "ciphertext1" and "ciphertext2" can be multiplied modulo $n^2$. The resulting ciphertext, when decrypted, will correspond to the sum of the original plaintext messages. This property allows the addition of encrypted values without revealing the individual values.

Homomorphic multiplication, on the other hand, involves raising a ciphertext "ciphertext" to the power of a plaintext "plaintext" modulo $n^2$. The resulting ciphertext, when decrypted, will correspond to the product of the original plaintext message and the plaintext value used in the multiplication. This property enables the multiplication of an encrypted value by a known plaintext value.

To use the Paillier cryptosystem for homomorphic encryption, an instance of the cryptosystem is created with the chosen prime numbers p and q. Messages can then be encrypted using the "encrypt" method, producing ciphertexts. Homomorphic operations, such as addition and multiplication, can be performed on the ciphertexts using the corresponding methods provided by the cryptosystem.

Exemplary Computing Environment

FIG. 12 illustrates an exemplary computing environment on which an embodiment described herein may be implemented, in full or in part. This exemplary computing environment describes computer-related components and processes supporting enabling disclosure of computer-implemented embodiments. Inclusion in this exemplary computing environment of well-known processes and computer components, if any, is not a suggestion or admission that any embodiment is no more than an aggregation of such processes or components. Rather, implementation of an embodiment using processes and components described in this exemplary computing environment will involve programming or configuration of such processes and components resulting in a machine specially programmed or configured for such implementation. The exemplary computing environment described herein is only one example of such an environment and other configurations of the components and processes are possible, including other relationships between and among components, and/or absence of some processes or components described. Further, the exemplary computing environment described herein is not intended to suggest any limitation as to the scope of use or functionality of any embodiment implemented, in whole or in part, on components or processes described herein.

The exemplary computing environment described herein comprises a computing device 10 (further comprising a system bus 11, one or more processors 20, a system memory 30, one or more interfaces 40, one or more non-volatile data storage devices 50), external peripherals and accessories 60, external communication devices 70, remote computing devices 80, and cloud-based services 90.

System bus 11 couples the various system components, coordinating operation of and data transmission between those various system components. System bus 11 represents one or more of any type or combination of types of wired or wireless bus structures including, but not limited to, memory busses or memory controllers, point-to-point connections, switching fabrics, peripheral busses, accelerated graphics ports, and local busses using any of a variety of bus architectures. By way of example, such architectures include, but are not limited to, Industry Standard Architecture (ISA) busses, Micro Channel Architecture (MCA) busses, Enhanced ISA (EISA) busses, Video Electronics Standards Association (VESA) local busses, a Peripheral Component Interconnects (PCI) busses also known as a Mezzanine busses, or any selection of, or combination of, such busses. Depending on the specific physical implementation, one or more of the processors 20, system memory 30 and other components of the computing device 10 can be physically co-located or integrated into a single physical component, such as on a single chip. In such a case, some or all of system bus 11 can be electrical pathways within a single chip structure.

Computing device may further comprise externally-accessible data input and storage devices 12 such as compact disc read-only memory (CD-ROM) drives, digital versatile discs (DVD), or other optical disc storage for reading and/or writing optical discs 62; magnetic cassettes, magnetic tape, magnetic disk storage, or other magnetic storage devices; or any other medium which can be used to store the desired content and which can be accessed by the computing device 10. Computing device may further comprise externally-accessible data ports or connections 12 such as serial ports, parallel ports, universal serial bus (USB) ports, and infrared ports and/or transmitter/receivers. Computing device may further comprise hardware for wireless communication with external devices such as IEEE 1394 ("Firewire") interfaces, IEEE 802.11 wireless interfaces, BLUETOOTH® wireless interfaces, and so forth. Such ports and interfaces may be used to connect any number of external peripherals and accessories 60 such as visual displays, monitors, and touch-sensitive screens 61, USB solid state memory data storage drives (commonly known as "flash drives" or "thumb drives") 63, printers 64, pointers and manipulators such as mice 65, keyboards 66, and other devices 67 such as joysticks and gaming pads, touchpads, additional displays and monitors, and external hard drives (whether solid state or disc-based), microphones, speakers, cameras, and optical scanners.

Processors 20 are logic circuitry capable of receiving programming instructions and processing (or executing) those instructions to perform computer operations such as retrieving data, storing data, and performing mathematical calculations. Processors 20 are not limited by the materials from which they are formed or the processing mechanisms employed therein, but are typically comprised of semiconductor materials into which many transistors are formed together into logic gates on a chip (i.e., an integrated circuit or IC). The term processor includes any device capable of receiving and processing instructions including, but not limited to, processors operating on the basis of quantum computing, optical computing, mechanical computing (e.g., using nanotechnology entities to transfer data), and so forth. Depending on configuration, computing device 10 may comprise more than one processor. For example, computing device 10 may comprise one or more central processing units (CPUs) 21, each of which itself has multiple processors or multiple processing cores, each capable of independently or semi-independently processing programming instructions based on technologies like CISC or RISC. Further, computing device 10 may comprise one or more specialized processors such as a graphics processing unit (GPU) 22 configured to accelerate processing of computer graphics and images via a large array of specialized processing cores arranged in parallel. The term processor may further include: neural processing units (NPUs) or neural computing units optimized for machine learning and artificial intelligence workloads using specialized architectures and data paths;

tensor processing units (TPUs) designed to efficiently perform matrix multiplication and convolution operations used heavily in neural networks and deep learning applications; application-specific integrated circuits (ASICs) implementing custom logic for domain-specific tasks; application-specific instruction set processors (ASIPs) with instruction sets tailored for particular applications; field-programmable gate arrays (FPGAs) providing reconfigurable logic fabric that can be customized for specific processing tasks; processors operating on emerging computing paradigms such as quantum computing, optical computing, mechanical computing (e.g., using nanotechnology entities to transfer data), and so forth. Depending on configuration, computing device 10 may comprise one or more of any of the above types of processors in order to efficiently handle a variety of general purpose and specialized computing tasks. The specific processor configuration may be selected based on performance, power, cost, or other design constraints relevant to the intended application of computing device 10.

System memory 30 is processor-accessible data storage in the form of volatile and/or nonvolatile memory. System memory 30 may be either or both of two types: non-volatile memory and volatile memory. Non-volatile memory 30a is not erased when power to the memory is removed, and includes memory types such as read only memory (ROM), electronically-erasable programmable memory (EEPROM), and rewritable solid state memory (commonly known as "flash memory"). Non-volatile memory 30a is typically used for long-term storage of a basic input/output system (BIOS) 31, containing the basic instructions, typically loaded during computer startup, for transfer of information between components within computing device, or a unified extensible firmware interface (UEFI), which is a modern replacement for BIOS that supports larger hard drives, faster boot times, more security features, and provides native support for graphics and mouse cursors. Non-volatile memory 30a may also be used to store firmware comprising a complete operating system 35 and applications 36 for operating computer-controlled devices. The firmware approach is often used for purpose-specific computer-controlled devices such as appliances and Internet-of-Things (IoT) devices where processing power and data storage space is limited. Volatile memory 30b is erased when power to the memory is removed and is typically used for short-term storage of data for processing. Volatile memory 30b includes memory types such as random-access memory (RAM), and is normally the primary operating memory into which the operating system 35, applications 36, program modules 37, and application data 38 are loaded for execution by processors 20. Volatile memory 30b is generally faster than non-volatile memory 30a due to its electrical characteristics and is directly accessible to processors 20 for processing of instructions and data storage and retrieval. Volatile memory 30b may comprise one or more smaller cache memories which operate at a higher clock speed and are typically placed on the same IC as the processors to improve performance.

Interfaces 40 may include, but are not limited to, storage media interfaces 41, network interfaces 42, display interfaces 43, and input/output interfaces 44. Storage media interface 41 provides the necessary hardware interface for loading data from non-volatile data storage devices 50 into system memory 30 and storage data from system memory 30 to non-volatile data storage device 50. Network interface 42 provides the necessary hardware interface for computing device 10 to communicate with remote computing devices 80 and cloud-based services 90 via one or more external communication devices 70. Display interface 43 allows for connection of displays 61, monitors, touchscreens, and other visual input/output devices. Display interface 43 may include a graphics card for processing graphics-intensive calculations and for handling demanding display requirements. Typically, a graphics card includes a graphics processing unit (GPU) and video RAM (VRAM) to accelerate display of graphics. One or more input/output (I/O) interfaces 44 provide the necessary support for communications between computing device 10 and any external peripherals and accessories 60. For wireless communications, the necessary radio-frequency hardware and firmware may be connected to I/O interface 44 or may be integrated into I/O interface 44.

Non-volatile data storage devices 50 are typically used for long-term storage of data. Data on non-volatile data storage devices 50 is not erased when power to the non-volatile data storage devices 50 is removed. Non-volatile data storage devices 50 may be implemented using any technology for non-volatile storage of content including, but not limited to, CD-ROM drives, digital versatile discs (DVD), or other optical disc storage; magnetic cassettes, magnetic tape, magnetic disc storage, or other magnetic storage devices; solid state memory technologies such as EEPROM or flash memory; or other memory technology or any other medium which can be used to store data without requiring power to retain the data after it is written. Non-volatile data storage devices 50 may be non-removable from computing device 10 as in the case of internal hard drives, removable from computing device 10 as in the case of external USB hard drives, or a combination thereof, but computing device will typically comprise one or more internal, non-removable hard drives using either magnetic disc or solid state memory technology. Non-volatile data storage devices 50 may store any type of data including, but not limited to, an operating system 51 for providing low-level and mid-level functionality of computing device 10, applications 52 for providing high-level functionality of computing device 10, program modules 53 such as containerized programs or applications, or other modular content or modular programming, application data 54, and databases 55 such as relational databases, non-relational databases, object oriented databases, NoSQL databases, and graph databases.

Applications (also known as computer software or software applications) are sets of programming instructions designed to perform specific tasks or provide specific functionality on a computer or other computing devices. Applications are typically written in high-level programming languages such as C++, Java, Scala, Rust, Go, and Python, which are then either interpreted at runtime or compiled into low-level, binary, processor-executable instructions operable on processors 20. Applications may be containerized so that they can be run on any computer hardware running any known operating system. Containerization of computer software is a method of packaging and deploying applications along with their operating system dependencies into self-contained, isolated units known as containers. Containers provide a lightweight and consistent runtime environment that allows applications to run reliably across different computing environments, such as development, testing, and production systems.

The memories and non-volatile data storage devices described herein do not include communication media. Communication media are means of transmission of information such as modulated electromagnetic waves or modulated data signals configured to transmit, not store, information. By way of example, and not limitation, communication media includes wired communications such as sound signals transmitted to a speaker via a speaker wire, and wireless communications such as acoustic waves, radio frequency (RF) transmissions, infrared emissions, and other wireless media.

External communication devices 70 are devices that facilitate communications between computing device and either remote computing devices 80, or cloud-based services 90, or both. External communication devices 70 include, but are not limited to, data modems 71 which facilitate data transmission between computing device and the Internet 75 via a common carrier such as a telephone company or internet service provider (ISP), routers 72 which facilitate data transmission between computing device and other devices, and switches 73 which provide direct data communications between devices on a network. Here, modem 71 is shown connecting computing device 10 to both remote computing devices 80 and cloud-based services 90 via the Internet 75. While modem 71, router 72, and switch 73 are shown here as being connected to network interface 42, many different network configurations using external communication devices 70 are possible. Using external communication devices 70, networks may be configured as local area networks (LANs) for a single location, building, or campus, wide area networks (WANs) comprising data networks that extend over a larger geographical area, and virtual private networks (VPNs) which can be of any size but connect computers via encrypted communications over public networks such as the Internet 75. As just one exemplary network configuration, network interface 42 may be connected to switch 73 which is connected to router 72 which is connected to modem 71 which provides access for computing device 10 to the Internet 75. Further, any combination of wired 77 or wireless 76 communications between and among computing device 10, external communication devices 70, remote computing devices 80, and cloud-based services 90 may be used. Remote computing devices 80, for example, may communicate with computing device through a variety of communication channels 74 such as through switch 73 via a wired 77 connection, through router 72 via a wireless connection 76, or through modem 71 via the Internet 75. Furthermore, while not shown here, other hardware that is specifically designed for servers may be employed. For example, secure socket layer (SSL) acceleration cards can be used to offload SSL encryption computations, and transmission control protocol/internet protocol (TCP/IP) offload hardware and/or packet classifiers on network interfaces 42 may be installed and used at server devices.

In a networked environment, certain components of computing device 10 may be fully or partially implemented on remote computing devices 80 or cloud-based services 90. Data stored in non-volatile data storage device 50 may be received from, shared with, duplicated on, or offloaded to a non-volatile data storage device on one or more remote computing devices 80 or in a cloud computing service 92. Processing by processors 20 may be received from, shared with, duplicated on, or offloaded to processors of one or more remote computing devices 80 or in a distributed computing service 93. By way of example, data may reside on a cloud computing service 92, but may be usable or otherwise accessible for use by computing device 10. Also, certain processing subtasks may be sent to a microservice 91 for processing with the result being transmitted to computing device 10 for incorporation into a larger processing task. Also, while components and processes of the exemplary computing environment are illustrated herein as discrete units (e.g., OS 51 being stored on non-volatile data storage device 51 and loaded into system memory 35 for use) such processes and components may reside or be processed at various times in different components of computing device 10, remote computing devices 80, and/or cloud-based services 90.

In an implementation, the disclosed systems and methods may utilize, at least in part, containerization techniques to execute one or more processes and/or steps disclosed herein. Containerization is a lightweight and efficient virtualization technique that allows you to package and run applications and their dependencies in isolated environments called containers. One of the most popular containerization platforms is Docker, which is widely used in software development and deployment. Containerization, particularly with opensource technologies like Docker and container orchestration systems like Kubernetes, is a common approach for deploying and managing applications. Containers are created from images, which are lightweight, standalone, and executable packages that include application code, libraries, dependencies, and runtime. Images are often built from a Dockerfile or similar, which contains instructions for assembling the image. Dockerfiles are configuration files that specify how to build a Docker image. Systems like Kubernetes also support containerd or CRI-O. They include commands for installing dependencies, copying files, setting environment variables, and defining runtime configurations. Docker images are stored in repositories, which can be public or private. Docker Hub is an exemplary public registry, and organizations often set up private registries for security and version control using tools such as Hub, JFrog Artifactory and Bintray, Github Packages or Container registries. Containers can communicate with each other and the external world through networking. Docker provides a bridge network by default, but can be used with custom networks. Containers within the same network can communicate using container names or IP addresses.

Remote computing devices 80 are any computing devices not part of computing device 10. Remote computing devices 80 include, but are not limited to, personal computers, server computers, thin clients, thick clients, personal digital assistants (PDAs), mobile telephones, watches, tablet computers, laptop computers, multiprocessor systems, microprocessor based systems, set-top boxes, programmable consumer electronics, video game machines, game consoles, portable or handheld gaming units, network terminals, desktop personal computers (PCs), minicomputers, mainframe computers, network nodes, virtual reality or augmented reality devices and wearables, and distributed or multi-processing computing environments. While remote computing devices 80 are shown for clarity as being separate from cloud-based services 90, cloud-based services 90 are implemented on collections of networked remote computing devices 80.

Cloud-based services 90 are Internet-accessible services implemented on collections of networked remote computing devices 80. Cloud-based services are typically accessed via application programming interfaces (APIs) which are software interfaces which provide access to computing services within the cloud-based service via API calls, which are pre-defined protocols for requesting a computing service and receiving the results of that computing service. While cloud-based services may comprise any type of computer processing or storage, three common categories of cloud-based services 90 are serverless logic apps, microservices 91, cloud computing services 92, and distributed computing services 93.

Microservices 91 are collections of small, loosely coupled, and independently deployable computing services.

Each microservice represents a specific computing functionality and runs as a separate process or container. Microservices promote the decomposition of complex applications into smaller, manageable services that can be developed, deployed, and scaled independently. These services communicate with each other through well-defined application programming interfaces (APIs), typically using lightweight protocols like HTTP or message queues. Microservices 91 can be combined to perform more complex or distributed processing tasks. In an embodiment, Kubernetes clusters with containerd resources is used for operational packaging of system.

Cloud computing services 92 are delivery of computing resources and services over the Internet 75 from a remote location. Cloud computing services 92 provide additional computer hardware and storage on as-needed or subscription basis. Cloud computing services 92 can provide large amounts of scalable data storage, access to sophisticated software and powerful server-based processing, or entire computing infrastructures and platforms. For example, cloud computing services can provide virtualized computing resources such as virtual machines, storage, and networks, platforms for developing, running, and managing applications without the complexity of infrastructure management, and complete software applications over public or private networks or the Internet on a subscription or alternative licensing basis.

Distributed computing services 93 provide large-scale processing using multiple interconnected computers or nodes to solve computational problems or perform tasks collectively. In distributed computing, the processing and storage capabilities of multiple machines are leveraged to work together as a unified system. Distributed computing services are designed to address problems that cannot be efficiently solved by a single computer or that require large-scale computational power or support for highly dynamic compute, transport or storage resource variance over time requiring scaling up and down of constituent system resources. These services enable parallel processing, fault tolerance, and scalability by distributing tasks across multiple nodes.

Although described above as a physical device, computing device 10 can be a virtual computing device, in which case the functionality of the physical components herein described, such as processors 20, system memory 30, network interfaces 40, NVLink or other GPU-to-GPU high bandwidth communications links and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where computing device 10 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. Thus, computing device 10 may be either a physical computing device or a virtualized computing device within which computer-executable instructions can be executed in a manner consistent with their execution by a physical computing device. Similarly, terms referring to physical components of the computing device, as utilized herein, mean either those physical components or virtualizations thereof performing the same or equivalent functions.

The skilled person will be aware of a range of possible modifications of the various aspects described above. Accordingly, the present invention is defined by the claims and their equivalents.

What is claimed is:

1. A method for homomorphic data compression, comprising the steps of:
   quantizing input data into a set of intervals, each interval represented by a codeword;
   generating a codebook by assigning codewords to intervals;
   applying at least one error correction technique, wherein at least one error correction technique includes:
   representing each codeword as a set of residues;
   performing operations independently on each residue; and
   combining the results to obtain the final result;
   compressing the quantized data by replacing each interval with its corresponding codeword from the codebook;
   decrypting the compressed codewords to obtain intermediate results;
   applying error correction techniques to the intermediate results; and
   re-encrypting the corrected results to obtain updated compressed codewords; and
   enabling operations to be performed on the compressed codewords.

2. The method of claim 1, wherein the codebook generation technique is chosen from the group consisting of entropy-based coding techniques and machine learning-based techniques.

3. The method of claim 1, wherein the operations include mathematical operations.

4. The method of claim 1, wherein at least one error correction technique includes encoding techniques.

5. The method of claim 4, wherein the encoding techniques are selected from the group consisting of error correction codes and number system encoding.

6. The method of claim 4, wherein at least one error correction technique includes iterative process, comprising:
   performing operations on the compressed codewords to obtain initial results; and
   iteratively applying error correction techniques to the results and using the corrected results as input for subsequent iterations.

7. The method of claim 1, wherein at least one error correction technique includes codebook optimization, comprising:
   constructing the codebook using a learning-based approach to minimize errors when performing operations on the codewords; and
   training a machine learning model to generate codewords that minimize the difference between the operation results and the expected results.

8. The method of claim 1, wherein generating the codebook comprises:
   constructing the codebook using a learning-based approach to minimize errors when performing operations on the codewords; and
   training a machine learning model to generate codewords that minimize the difference between the operation results and the expected result.

9. A system for homomorphic data compression, comprising:

a computing device comprising at least a memory and a processor;

a codebook-based homomorphic encryption platform comprising a first plurality of programming instructions that, when operating on the processor, cause the computing device to:

quantize input data into a set of intervals, each interval represented by a codeword;

generate a codebook by assigning codewords to intervals;

apply at least one error correction technique, wherein at least one error correction technique includes:

representing each codeword as a set of residues;

performing operations independently on each residue; and combining the results to obtain the final result;

compressing the quantized data by replacing each interval with its corresponding codeword from the codebook;

decrypting the compressed codewords to obtain intermediate results;

applying error correction techniques to the intermediate results; and re-encrypting the corrected results to obtain updated compressed codewords; and enable operations to be performed on the compressed codewords.

10. The system of claim 9, wherein the codebook generation technique is chosen from the group consisting of entropy-based coding techniques and machine learning-based techniques.

11. The system of claim 9, wherein the operations include mathematical operations.

12. The system of claim 9, wherein at least one error correction technique includes encoding techniques.

13. The system of claim 12, wherein the encoding techniques are selected from the group consisting of error correction codes and number system encoding.

14. The system of claim 12, wherein at least one error correction technique includes iterative process, comprising:

perform operations on the compressed codewords to obtain initial results; and iteratively apply error correction techniques to the results and using use the corrected results as input for subsequent iterations.

15. The system of claim 9, wherein at least one error correction technique includes codebook optimization, comprising:

constructing the codebook using a learning-based approach to minimize errors when performing operations on the codewords; and training a machine learning model to generate codewords that minimize the difference between the operation results and the expected results.

16. The system of claim 9, wherein generating the codebook comprises:

constructing the codebook using a learning-based approach to minimize errors when performing operations on the codewords; and training a machine learning model to generate codewords that minimize the difference between the operation results and the expected result.

* * * * *